(12) United States Patent
Jeong et al.

(10) Patent No.: US 11,811,434 B2
(45) Date of Patent: Nov. 7, 2023

(54) DEVICE AND METHOD FOR TRANSMITTING AND RECEIVING EMULATED WI-FI PACKETS

(71) Applicant: Korea Advanced Institute of Science and Technology, Daejeon (KR)

(72) Inventors: Woo Jae Jeong, Daejeon (KR); Song Min Kim, Daejeon (KR); Jin Hwan Jung, Daejeon (KR); Seok Won Yang, Daejeon (KR); Yung Yi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 108 days.

(21) Appl. No.: 17/286,729

(22) PCT Filed: Aug. 3, 2020

(86) PCT No.: PCT/KR2020/010235
§ 371 (c)(1),
(2) Date: Apr. 19, 2021

(87) PCT Pub. No.: WO2022/030656
PCT Pub. Date: Feb. 10, 2022

(65) Prior Publication Data
US 2022/0311454 A1 Sep. 29, 2022

(51) Int. Cl.
*H04B 1/00* (2006.01)
*H04L 27/18* (2006.01)
(Continued)

(52) U.S. Cl.
CPC .......... *H04B 1/0003* (2013.01); *H04L 27/18* (2013.01); *H04L 27/34* (2013.01); *H04W 52/18* (2013.01); *H04W 84/12* (2013.01)

(58) Field of Classification Search
CPC .... H04B 1/0003; H04B 17/3912; H04B 1/00; H04L 27/18; H04L 27/34; H04L 27/0008;
(Continued)

(56) References Cited

U.S. PATENT DOCUMENTS

| 2006/0088120 A1* | 4/2006 | Hansen | H04B 7/0613 375/267 |
| 2013/0113659 A1* | 5/2013 | Morgan | G01S 3/046 702/70 |

(Continued)

FOREIGN PATENT DOCUMENTS

| JP | 2013-541242 A | 11/2013 |
| JP | 2016-152453 A | 8/2016 |

OTHER PUBLICATIONS

"SDR Receiver Using Commodity WiFi via Physical-Layer Signal Reconstruction"; Jeong et al.; MobiCom '20: Proceedings of the 26th Annual International Conference on Mobile Computing and Networking, published Apr. 17, 2020 (Year: 2020).*

(Continued)

*Primary Examiner* — Benjamin H Elliott, IV
(74) *Attorney, Agent, or Firm* — Paratus Law Group, PLLC

(57) ABSTRACT

A wireless device driving method includes hiding a header emulated with a second protocol in a payload of a packet defined with a first protocol and transmitting the emulated header at a transmission side, receiving the emulated header and an ambient signal at a reception side, and decoding the ambient signal according to the second protocol to obtain a bit sequence.

20 Claims, 31 Drawing Sheets

(51) Int. Cl.
*H04L 27/34* (2006.01)
*H04W 52/18* (2009.01)
*H04W 84/12* (2009.01)

(58) Field of Classification Search
CPC ... H04L 27/2035; H04L 27/362; H04L 27/38; H04L 5/0048; H04L 1/00; H04L 9/40; H04L 27/26; H04W 52/18; H04W 84/12
See application file for complete search history.

(56) References Cited

U.S. PATENT DOCUMENTS

| | | | | |
|---|---|---|---|---|
| 2018/0352055 | A1* | 12/2018 | He | H04L 1/0083 |
| 2019/0373639 | A1* | 12/2019 | Elliott | H04L 69/08 |
| 2021/0289577 | A1* | 9/2021 | Yao | H04L 69/08 |
| 2022/0077878 | A1* | 3/2022 | Husain | G06N 3/126 |
| 2022/0311454 | A1* | 9/2022 | Jeong | H04B 1/0003 |

OTHER PUBLICATIONS

"Reliable Physical-Layer Cross-Technology Communication With Emulation Error Correction"; Chen et al.; IEEE/ACM Transactions on Networking, vol. 28, No. 2, Apr. 2020 (Year: 2020).*

"SoftHM: A Software-Based Hierarchical Modulation Design for Wireless System"; Chen et al.; IEEE/ACM Transactions on Networking, vol. 29, No. 1, Feb. 2021 (Year: 2021).*

"Transparent Cross-technology Communication over Data Traffic"; Jiang et al.; IEEE INFOCOM 2017—IEEE Conference on Computer Communications (Year: 2017).*

"TwinBee: Reliable Physical-Layer Cross-Technology Communication with Symbol-Level Coding"; Chen et al.; IEEE INFOCOM 2018—IEEE Conference on Computer Communications (Year: 2018).*

"WIDE: Physical-level CTC via Digital Emulation"; Guo et al.; 2019 18th ACM/IEEE International Conference on Information Processing in Sensor Networks (IPSN) (Year: 2019).*

International Search Report for PCT/KR2020/010235 dated Apr. 28, 2021 from Korean Intellectual Property Office.

Korean Office Action for related KR Application No. 10-2020-0130074 dated May 21, 2021 from Korean Intellectual Property Office.

Zhijun Li et al., "WEBee: Physical-Layer Cross-Technology Communication via Emulation", ACM MobiCom 2017, Proceedings of the 23rd Annual International Conference on Mobile Computing and Networking, Oct. 2017, pp. 2-14, Snowbird, Utah, U.S.A.

Vincent Liu et al., "Ambient Backscatter: Wireless Communication Out of Thin Air", ACM SIGCOMM 2013, Proceedings of the ACM SIGCOMM 2013 conference on SIGCOMM, Aug. 2013, pp. 1-12, Hong Kong, China.

* cited by examiner

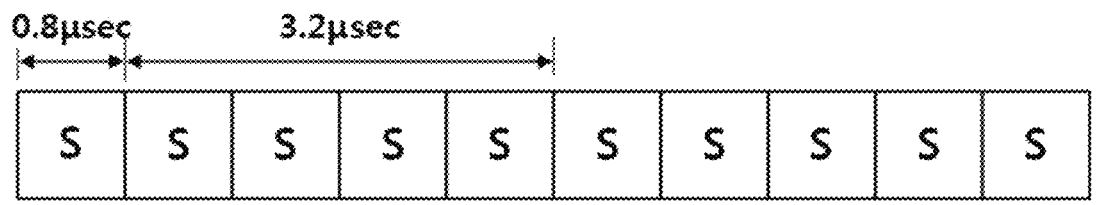
Fig. 5A
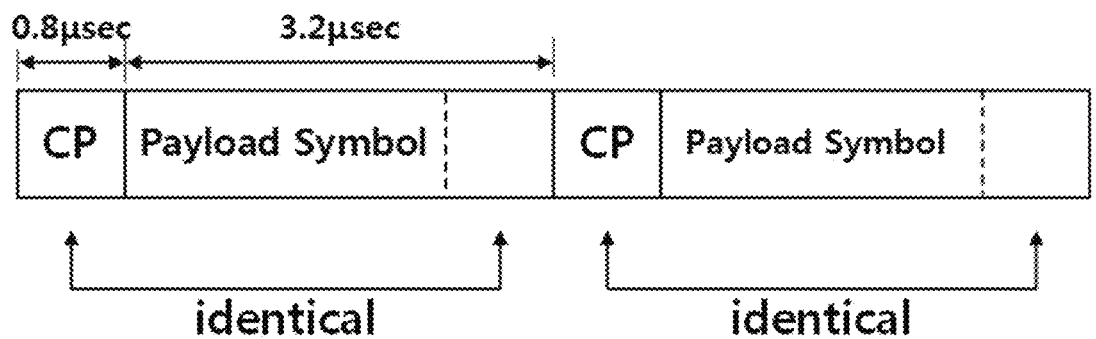
Fig. 5B
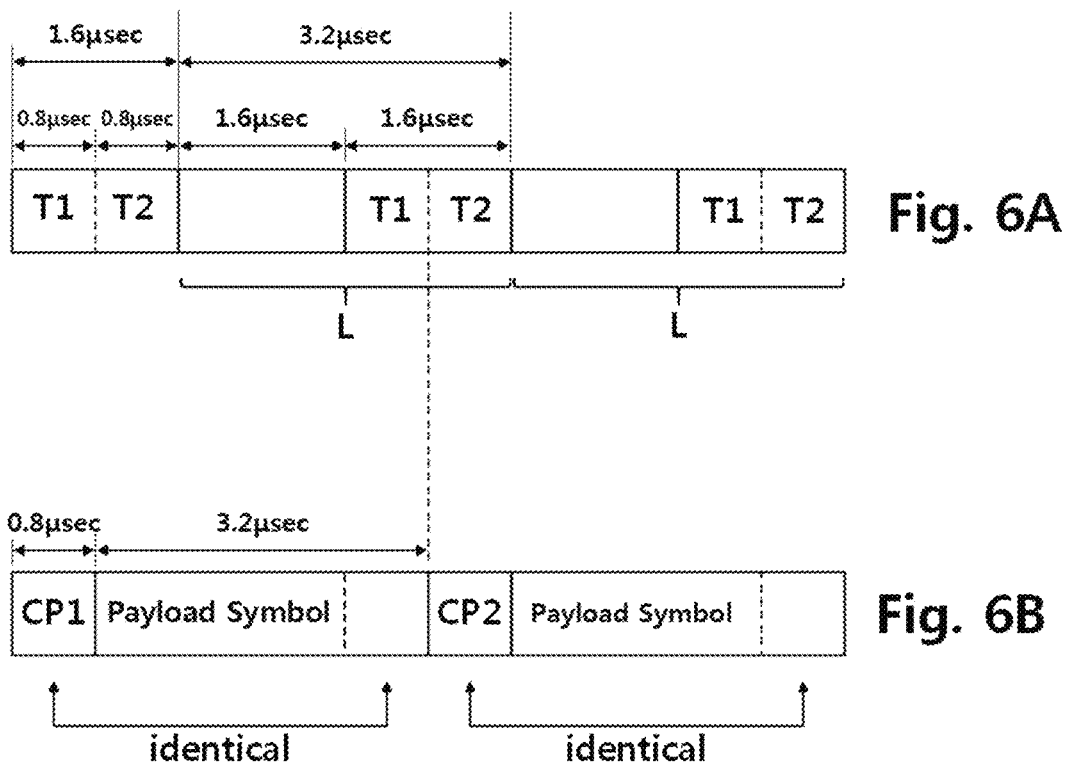
Fig. 6A
Fig. 6B

Symbol (Time) Waterfall
Subcarrier (Frequency)
BLE Signal

16 QAM

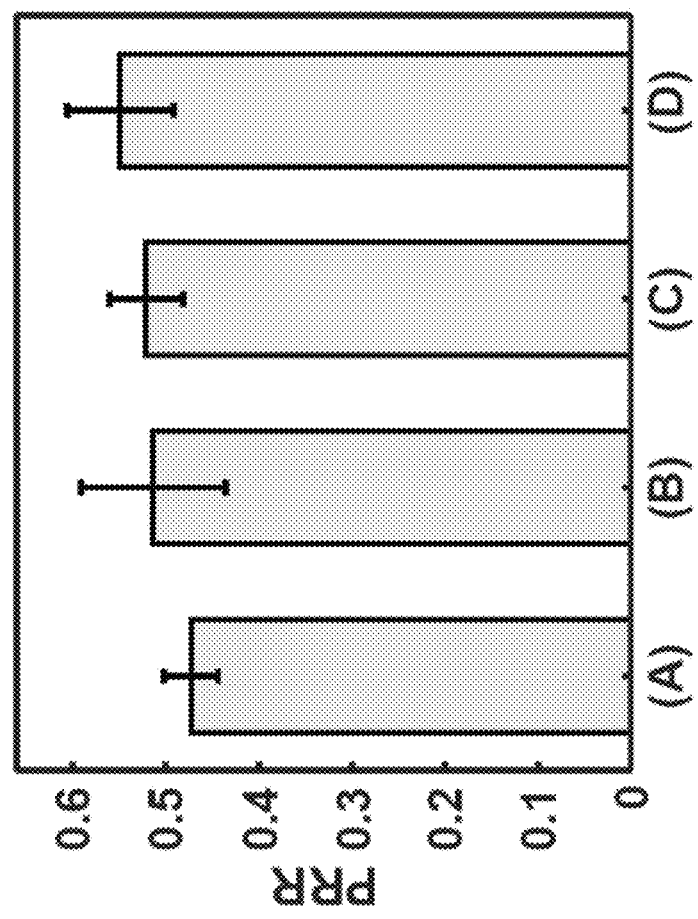
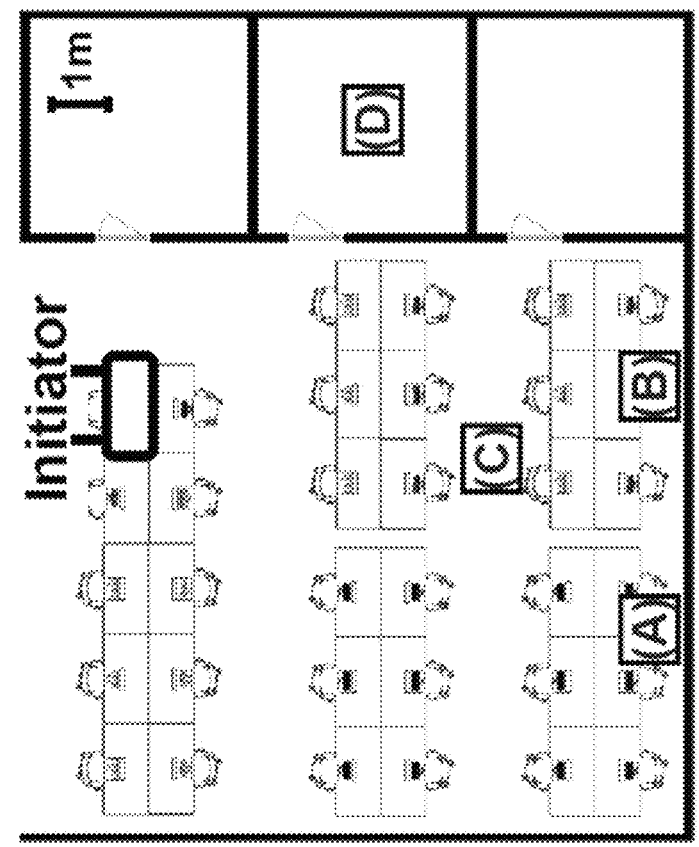
Fig. 18A
Fig. 18B

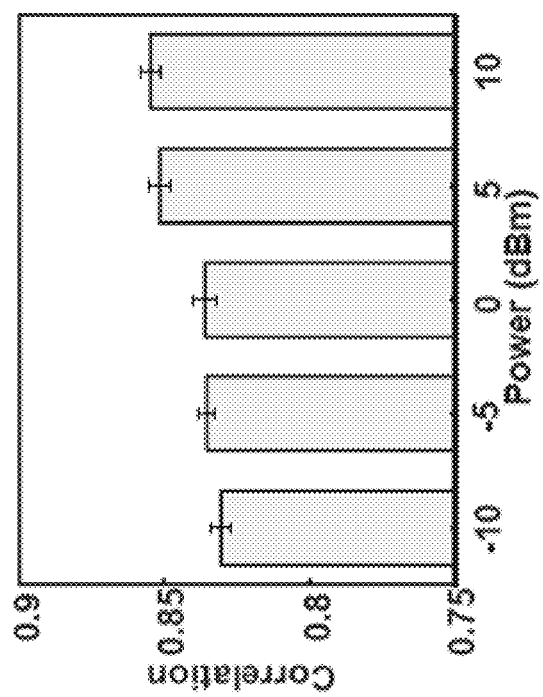
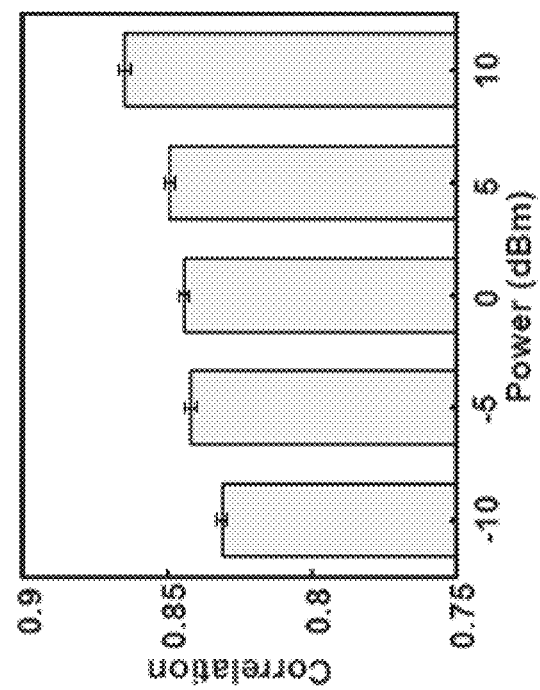
Fig. 19A
Fig. 19B

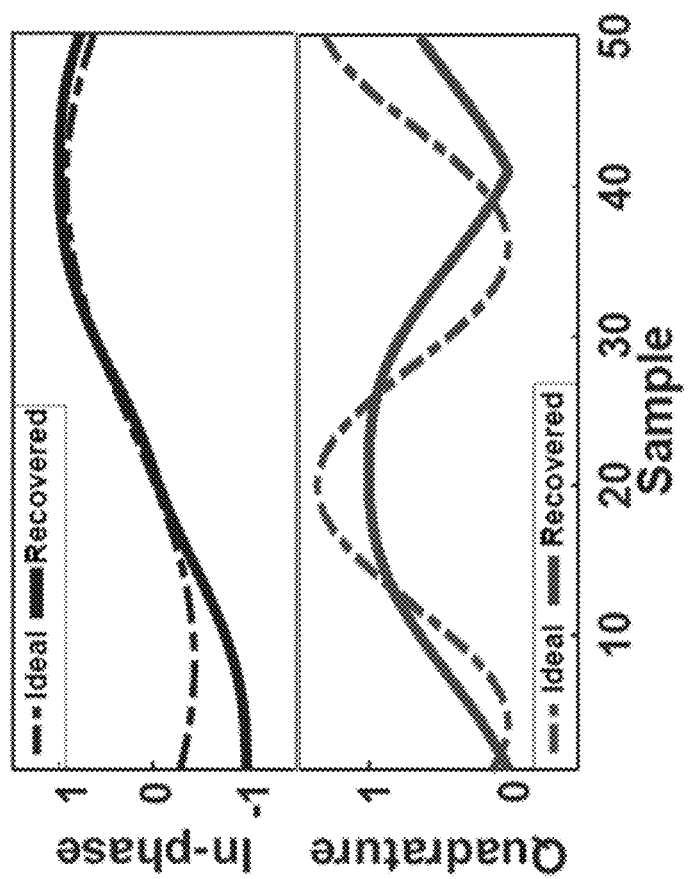
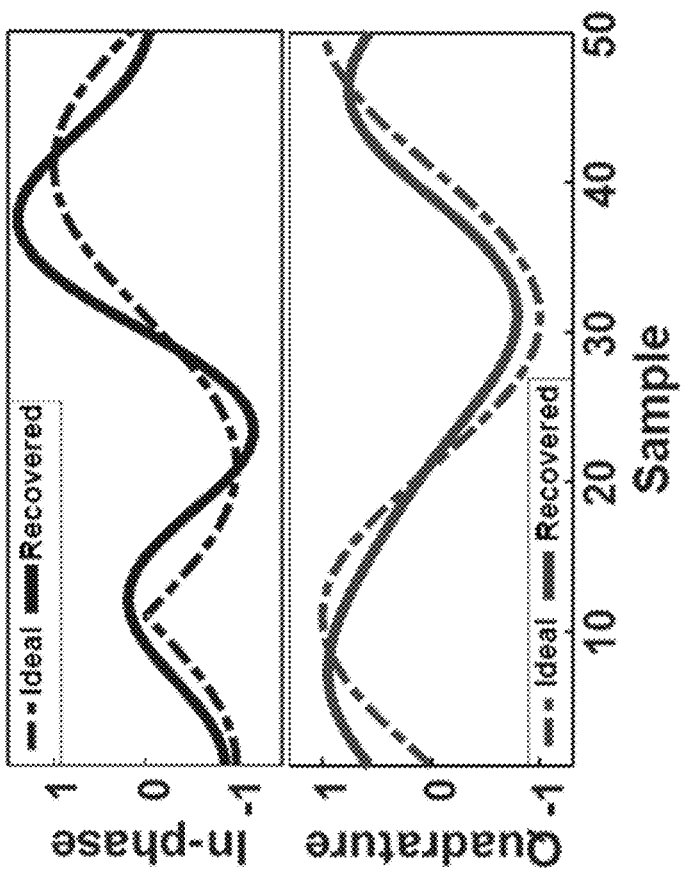
Fig. 20B
Fig. 20A

DEVICE AND METHOD FOR TRANSMITTING AND RECEIVING EMULATED WI-FI PACKETS

CROSS-REFERENCE TO PRIOR APPLICATION

This application is a National Stage Patent Application of PCT International Patent Application No. PCT/KR2020/010235 (filed on Aug. 3, 2020) under 35 U.S.C. § 371, which is hereby incorporated by reference in its entirety.

BACKGROUND

The following description relates to a transmission side, a reception side, and a wireless device driving method including the same.

With the explosive increase of wireless devices, physical layer signal analysis is beneficial in unique areas such as network planning, security and privacy protection (e.g., drone and spy cam detection), and interference minimization in mobile conditions through remote sensing. Software-defined radio (SDR) is known to be very effective in realizing such a service but is hardly distributed or used by end-users due to expensive hardware. A low-cost SDR is available but operates below 2.4 GHz, so the operating frequency range is outside the unlicensed band.

SUMMARY

The present disclosure relates to software-defined radio (SDR) which uses commercial Wi-Fi without changing hardware and firmware. The present disclosure is intended to improve daily life by spreading to Wi-Fi users and homes by using software radio devices compatible with the widespread Wi-Fi infrastructure.

A wireless device driving method according to this embodiment includes hiding a header emulated with a second protocol in a payload of a packet defined with a first protocol and transmitting the emulated header at a transmission side, receiving the emulated header and an ambient signal at a reception side, and decoding the ambient signal according to the second protocol to obtain a bit sequence.

A transmission side according to this embodiment is configured to hide a header emulated with a second protocol in a payload of a packet conforming to a first protocol and transmit the emulated header.

A reception side according to this embodiment is configured to receive an ambient signal and a header emulated with a second protocol, hidden in a payload of a packet defined with a first protocol, and then transmitted, configured to decode the ambient signal according to the second protocol to obtain a bit sequence, and configured to reconstruct the ambient signal from the bit sequence.

According to the present disclosure, it is possible to identify an RF device through an ambient signal, monitor the spectrum of an ambient signal, and decode an ambient signal.

BRIEF DESCRIPTION OF THE DRAWINGS

FIG. 5A is a diagram showing 10 short symbols (S) included in a preamble, and FIG. 5B is a diagram schematically showing a symbol structure of a payload.

FIG. 6A is a diagram showing the overview of 2.5 long symbols (L) included in a Wi-Fi header, and FIG. 6B is a diagram schematically showing a symbol structure of a payload.

FIG. 10A shows an emulation result for a short symbol, and FIG. 10B is a diagram showing an emulation result of a MAC modulated with 16 QAM.

FIG. 18A is a diagram showing various positions (A) to (D) of a device in an NLoS environment in which an initiator is fixed to a desk, and FIG. 18B is a diagram showing a PRR for each position.

FIG. 19A is a diagram showing the maximum correlation value between an ideal Zigbee signal and a Zigbee signal reconstructed when Tx power changes from −10 dBm to 10 dBm, and FIG. 19B is a diagram showing the maximum correlation value between an ideal Bluetooth Low Energy (BLE) signal and a reconstructed BLE signal under the same conditions.

FIGS. 20A and 20B show phase-corrected signals of Zigbee and BLE formed by performing the above-described phase compensation.

DETAILED DESCRIPTION

Figure 1:
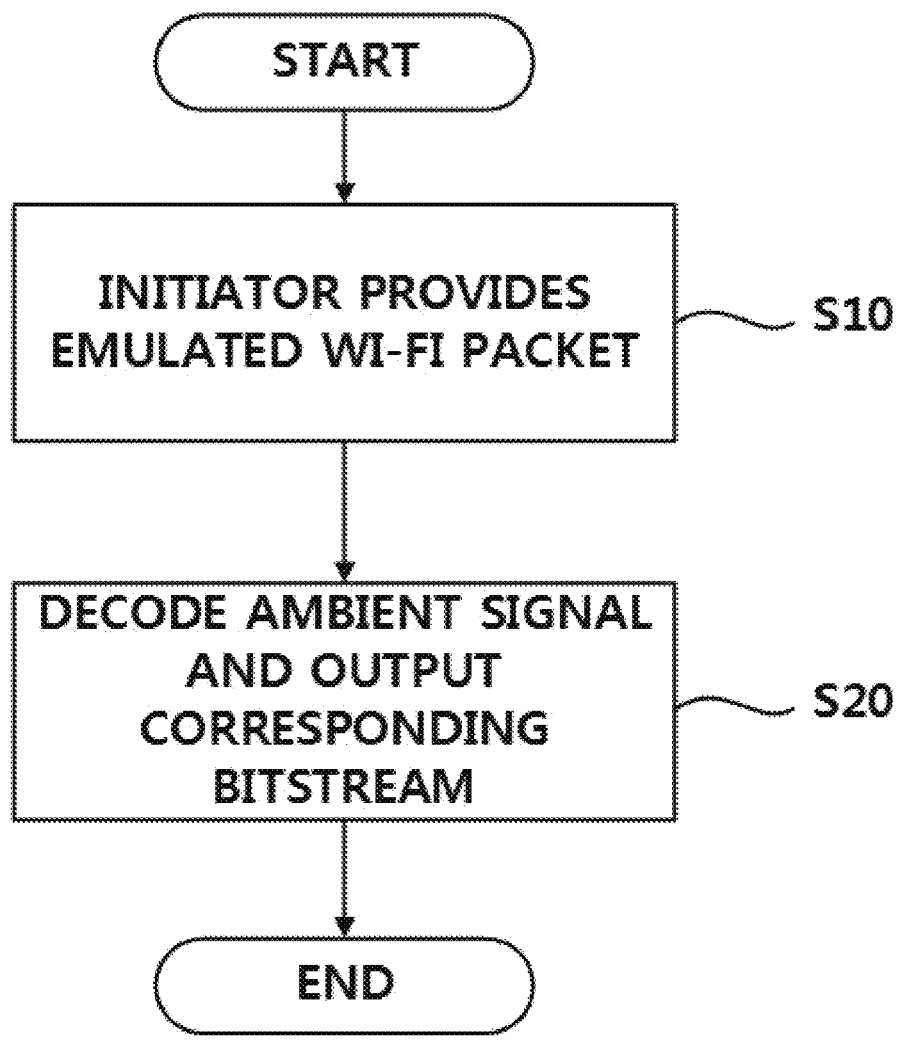
FIG. 1 is a flowchart schematically illustrating a method according to the present embodiment.
Figure 2:
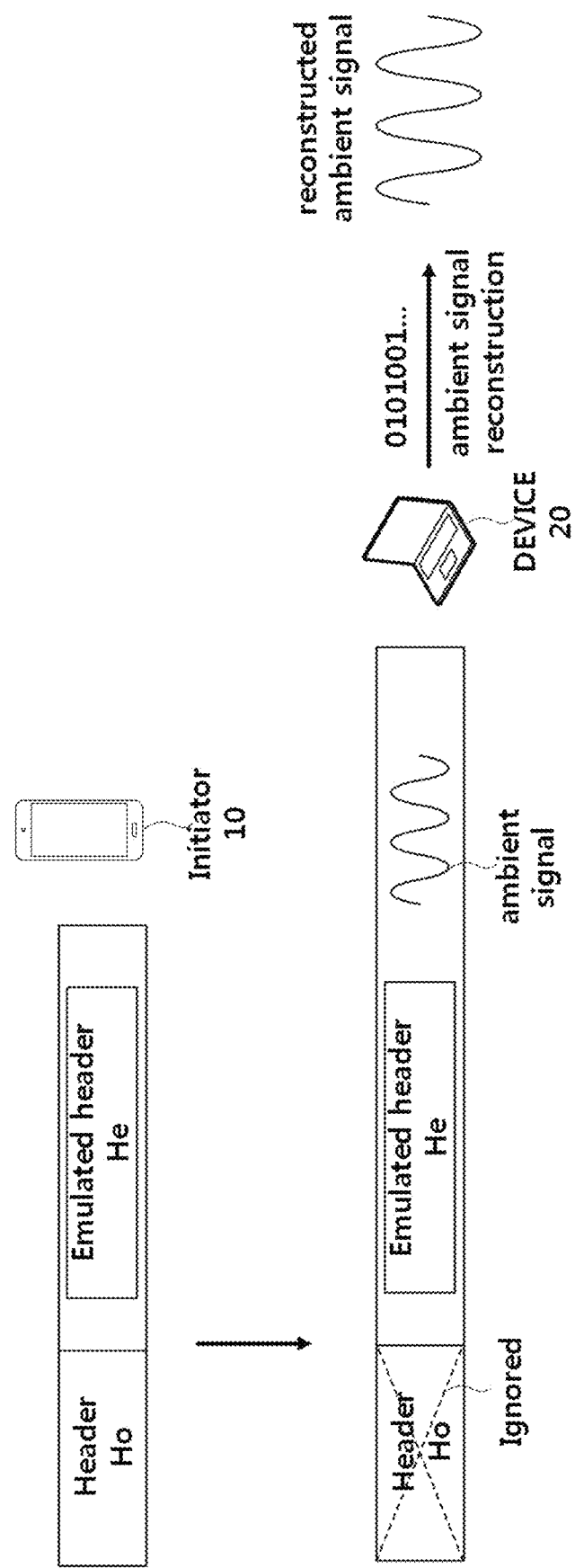
FIG. 2 is a schematic diagram schematically illustrating that a method is performed according to the present disclosure.

Hereinafter, a method according to the present embodiment will be described below with reference to the accompanying drawings. FIG. 1 is a flowchart schematically illustrating a method according to the present embodiment, and FIG. 2 is a schematic diagram schematically illustrating that a method is performed according to the present disclosure. Referring to FIGS. 1 and 2, the method according to the present embodiment includes an initiator 10 providing a packet including an emulated Wi-Fi header (He) (S10) and a device 20 decoding an ambient signal and outputting a corresponding bitstream (S20).

Figure 3:
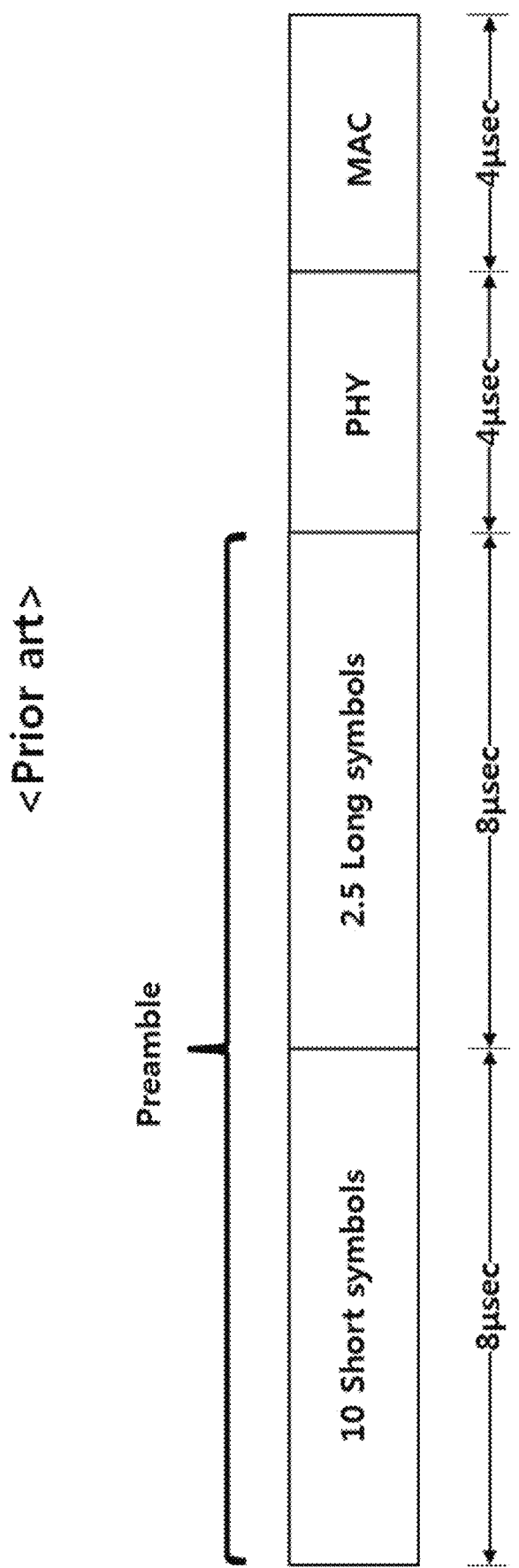
FIG. 3 is a diagram showing a Wi-Fi header structure defined in the 802.11g standard.

FIG. 3 shows a Wi-Fi header structure defined in an 802.11g-based standard. Referring to FIGS. 1 to 3, the header includes three fields, i.e., a preamble, PHY, and MAC. The preamble includes 10 short symbols and 2.5 long symbols and is used for packet detection, synchronization, and channel estimation. The PHY delivers physical layer information such as a modulation type, a code rate, and a packet length. In the MAC header, link layer information, such as a protocol version and a packet type, is described. When the Wi-Fi header is received, a receiver starts decoding the payload after the header during the packet length using modulation and code rates specified in the header.

The initiator 10 emulates the header (preamble, PHY, MAC header), hides the header in a payload, and provides the payload to the device 20. In an embodiment, a packet provided by the initiator 10 is packet conforming to the 802.11n protocol, and the header (He) hidden in the payload is a header conforming to the 802.11g protocol or is emulated according to the 802.11n protocol and hidden in the payload.

The device 20 receives the packet provided by the initiator 10, but the center frequency described in the original header Ho provided by the initiator is different from the center frequency of the packet, so the original header Ho is ignored. The device 20 performs decoding according to the emulated header He hidden in the payload. The payload decoding corresponding to the emulated header He is performed on an ambient signal corresponding to the emulated header He. Thus, an output bit sequence for reconfiguring the corresponding ambient signal is generated. This will be described below in detail.

In an embodiment, the initiator 10 may be set according to 802.11n with 40 MHz bandwidth, and this is generally supported by a wireless network interface controller (WNIC). In the 40 MHz, a partial spectrum of 20 MHz is used in an emulated header, and the center frequency is different from that of the initiator.

Figures 4A, 4B:
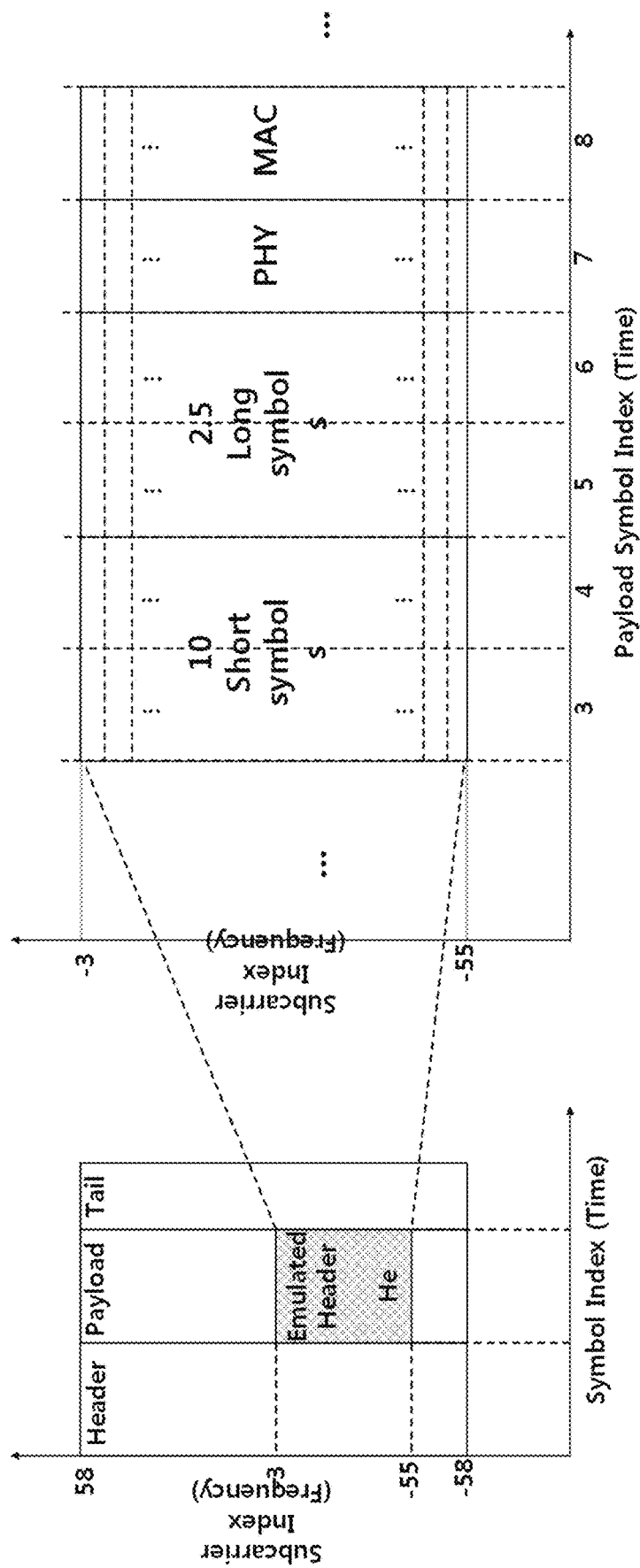
FIG. 4A is a diagram showing a packet structure of 802.11n with 40 MHz, which is provided by an initiator.
FIG. 4B is a diagram showing the structure of an emulated header of 802.11g with 20 MHz.

FIG. 4 is a diagram showing OFDM header emulation. FIG. 4A is a diagram showing a packet structure of 802.11n with 40 MHz, which is provided by the initiator 10, and FIG. 4B is a diagram showing the structure of an emulated header of 802.11g with 20 MHz. FIG. 4B shows an example in which the emulated header uses 52 short symbols (16.25 MHz, excluding a guard band) in the range of −55 to −3. The center frequency of the emulated header He is 2.417 GHz corresponding to Wi-Fi channel 2 and is different from the center frequency of the entire 40 MHz. Therefore, the device 20, which operates on the Wi-Fi channel 2, ignores the original header Ho and decodes packets according to the emulated header He. In the described example, the initiator 10 forms a 802.11g header at the center frequency corresponding to channel 2, hides the 802.11g header in a payload, and provides the payload to the device 20. The device operates on channel 2. However, this is just an embodiment, and initiator 10 may work with the device 20 on a channel other than channel 2. That is, the device of the other channel may be supported by sub-carrier allocation for emulation and various channels for the initiator 10.

The emulated header He is hidden in the payload of the packet provided by the initiator. The emulated header HE hidden in the payload causes symbol mismatch, constellation mismatch between the payload and the header due to separate modulation, and the like. The above-described mismatches are minimized or eliminated through the following process.

In FIG. 4B, PHY and MAC fields may be mapped on a one-to-one basis to one payload symbol and may be displayed as symbol 5 and symbol 6, respectively. This is because PHY and MAC headers share a symbol structure with 3.2 μsec symbol+0.8 μsec cyclic prefix (CP) like the payload. However, the preamble has a different symbol structure from the payload. As an example, the durations of the short symbol S and the long symbol L included in the preamble are 0.8 μsec and 3.2 μsec, respectively.

FIG. 5A is a diagram showing 10 short symbols S included in a preamble, and FIG. 5B is a diagram schematically showing a symbol structure of a payload. Referring to FIG. 5B, the payload has a structure in which a CP of 0.8 μsec and a payload symbol of 3.2 μsec are continuously repeated. The CP is identical to 0.8 μsec of the last payload symbol.

The payload configuration with this structure may be emulated with five short symbols S with a duration of 0.8 μsec as illustrated in FIG. 5A. That is, illustrated in FIG. 5A, the first short symbol S of 0.8 µsec is identical to the last short symbol S of 0.8 µsec and corresponds to the CP. The two to fifth short symbols S correspond to the payload symbol. Therefore, one payload symbol and one CP may be emulated using five short symbols S.

FIG. 6A is a diagram showing the overview of 2.5 long symbols (L) included in a Wi-Fi header, and FIG. 6B is a diagram schematically showing a symbol structure of a payload. As illustrated in FIG. 6A, the preamble includes a preceding half long symbol L and two long symbols L. The two long symbols L are the same, and the rear part (T1, T2) of 1.6 µsec in the long symbol is identical to the preceding half long symbol L.

As illustrated in FIG. 6B, CPI corresponds to the first 0.8-µsec part of the preceding half long symbol 0.5 L and corresponds to T1 of FIG. 6A. Likewise, T2 of the long symbol L of FIG. 6A corresponds to CP2 of the payload illustrated in FIG. 6B. The last 0.8 µsec of each payload symbol matches the first 0.8 µsec and complies with the payload CP requirements. From this, it can be seen that a sequence of 2½ long symbols can be effectively emulated as payload symbols.

When a mapped symbol is given, subcarriers are emulated through constellation mapping. As an example, the device 20 is set according to 802.11g. The preamble and PHY are modulated with BPSK, and MAC is modulated with 16-quadrature amplitude modulation (QAM). On the contrary, the payload has various modulation options depending on the Modulation and Coding Scheme (MCS). It is possible to minimize errors of the constellation mapping by adopting 64-QAM, which is the most segmented constellation, among the modulation options. Therefore, the initiator 10 is set according to 64 QAM of code rate ⅚ (802.11n MCS 7).

Figure 7A:
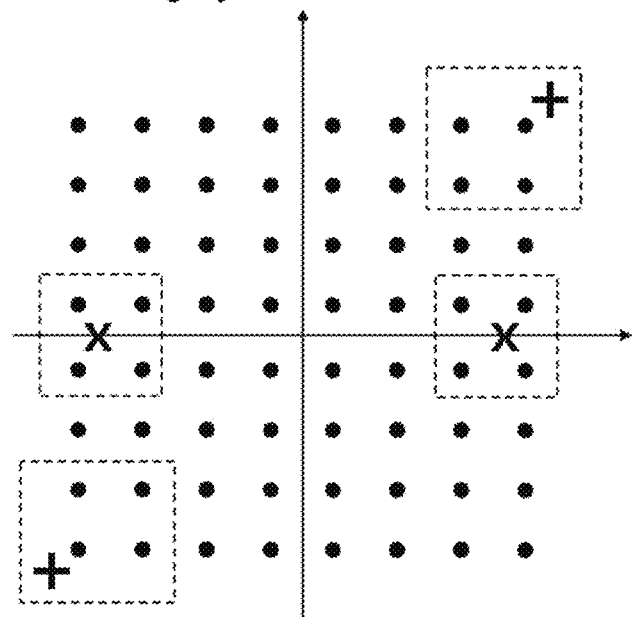
FIG. 7A is a diagram showing BPSK constellation points of a PHY field and a preamble including a long symbol and a short symbol in relation to 64 quadrature amplitude modulation (QAM) points used in a payload.
Figure 7B:
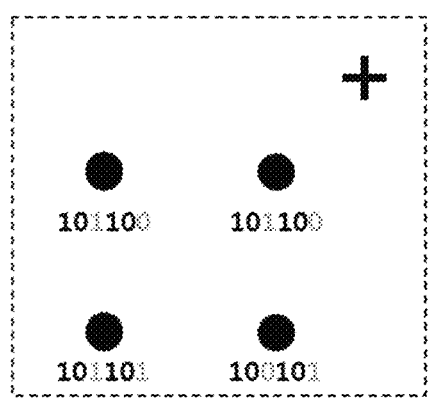
FIG. 7B is a diagram showing emulation of a short symbol.
Figure 7C:
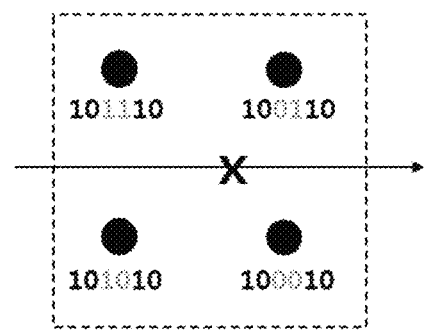
FIG. 7C is a diagram showing four points (dotted boxes) closest to a point where PHY and a long symbol are located.

FIGS. 7A to 7C are diagrams illustrating constellation mapping between a header symbol and a payload symbol. FIG. 7A shows BPSK constellation points of a PHY field and a preamble including long symbols and short symbols with regard to 64 QAM points used for a payload. To minimize emulation errors, the 64 QAM constellation points closest to BPSK should be selected for emulation, under the limit by the code rate.

FIG. 7B shows the emulation of a short symbol. Short symbols are located at points marked with "+" on the constellation illustrated in FIG. 7A. The emulated short symbols may only correspond to a maximum of four bits out of six bits allocated for each 64-QAM point at a ⅚ code rate, and the remaining two bits are generated by coding and thus cannot be controlled.

Under these constraints, it is possible to minimize emulation errors by selecting four common bits in four points (in a dotted box) closest to the point (+) where the short symbol is located. Through such mapping, short symbols are guaranteed to be emulated at one of the four closest points (in the dotted box). This takes advantage of the fact that in a 64-QAM constellation, adjacent constellation points differ only by one bit through gray coding.

Long symbols and PHY are modulated with BPSK and are located at points marked with "x" on the I-axis. As shown in FIG. 7C, four points (in the dotted box) closest to a point where a long symbol and PHY are located may be selected, and four common bits of the points may be guaranteed to be emulated. Thus, it is possible to minimize emulation errors.

Figure 8:
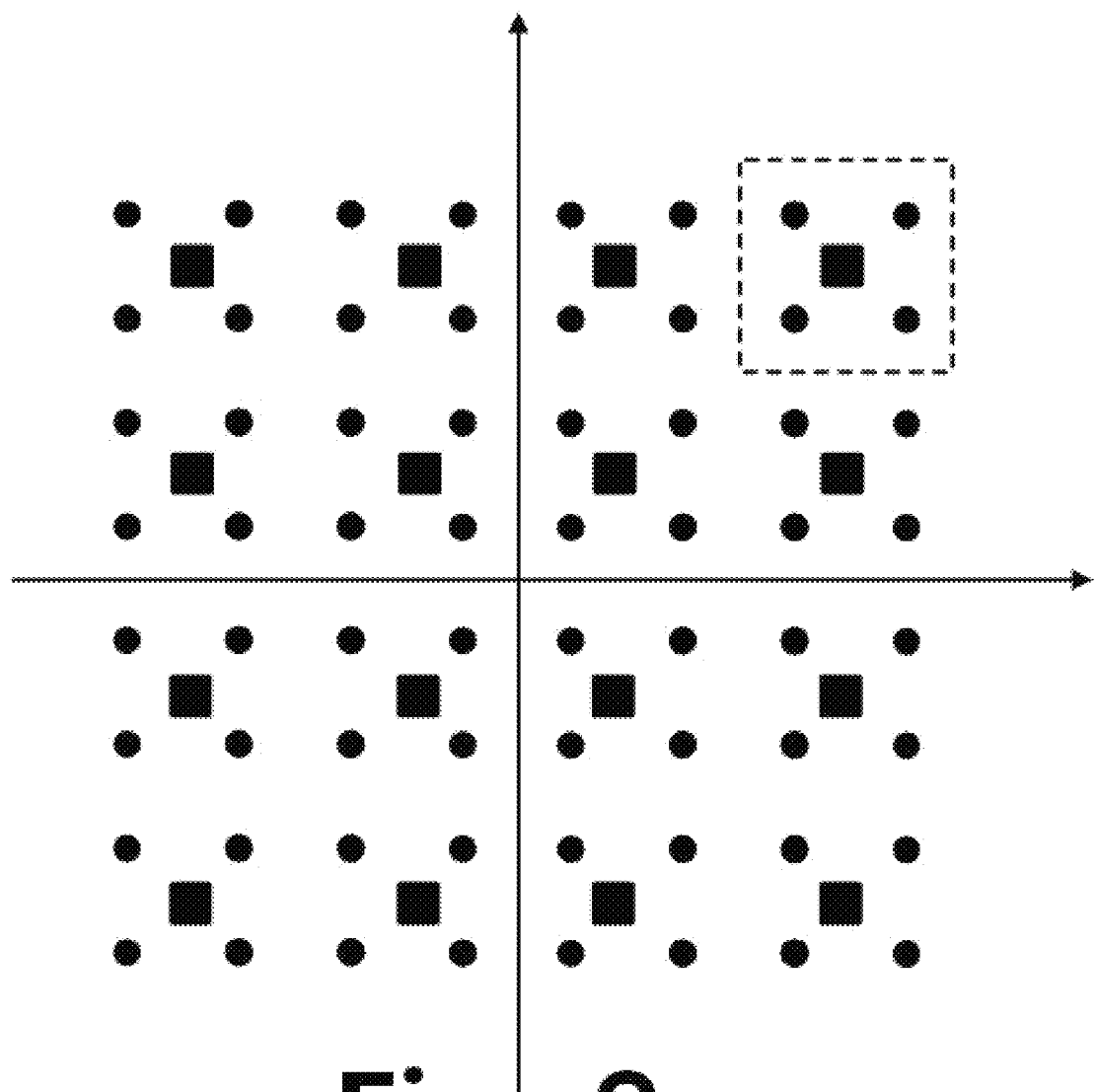
FIG. 8 is a diagram showing 16-QAM constellation mapping that is used in a MAC header.

FIG. 8 shows 16-QAM constellation mapping that is used in a MAC header. Referring to FIG. 8, the four closest 64-QAM points are mapped for each 16-QAM constellation point and may be mapped to four common bits as in the embodiment illustrated in FIG. 7. Like BPSK constellation mapping, it is possible to minimize emulation errors even under real Wi-Fi hardware constraints.

Figure 9:
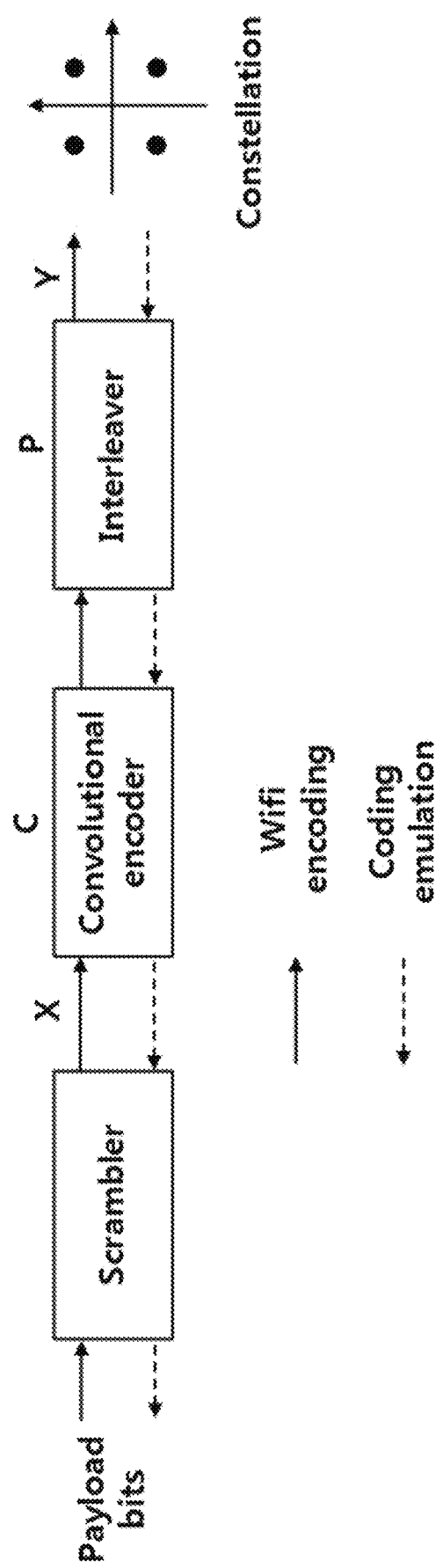
FIG. 9 is a diagram showing a Wi-Fi encoding mechanism and a coding emulation mechanism.

FIG. 9 is a diagram showing a Wi-Fi encoding mechanism and a coding emulation mechanism. OFDM emulation outputs six coded bits per subcarrier, and each subcarrier corresponds to a 64-QAM point. One symbol of the initiator 10 set to 40 MHz 64 QAM 802.11n has 108 short symbols. The short symbols are converted into a total of 648 (=108*6 bits/subcarrier) coded bits marked with "Y." In FIG. 9, coding emulation indicated by dashed arrows is for finding a pre-coded bit sequence X that generates "Y" through Wi-Fi encoding indicated by solid arrows. In other words, for given Y, X is computed. In this case, an interleaver and a convolutional encoder are reverse engineered.

A coded bit of Y is generated from 540 (=648*⅚ code rate) input bits of X and six bits delivered from the previous symbol $X_b$. Suppose that the Galois Finite field matrix GF(2) of $[C_b \ C]$ and P represent interleaving and convolutional coding matrices, respectively, $C_b$ is the first six columns of the convolution matrix $X_b$. Then, Wi-Fi encoding is expressed using Equation 1 below.

$$P[C_b \ C]\begin{bmatrix} X_b \\ X \end{bmatrix} = PC_b X_b + PCX = Y. \quad \text{[Equation 1]}$$

$X_b$ is provided by the previous symbol, $C_b$ and P are determined as Wi-Fi standards, and $PC_b X_b$ is a constant. Then, when it is assumed that $Y'=Y-PC_b X_b$ and Equation 1 is reconstructed into a linear equation, Equation 2 below is obtained.

$$(PC)X=Y' \quad \text{[Equation 2]}$$

PC is a 648×540 matrix. In order to emulate 54 subcarriers (20 MHz) to each of which four selected bits are allocated, a total of 216 bits are selected from among 648 output bits of Y. When a 216-bit sub-vector is $Y_{216}$ and the corresponding PC matrix is $(PC)_{216}$, $(PC)_{216}X=Y_{216}$. As a result, since the $(PC)_{216}$ matrix is a standard-based full rank matrix, there are various solutions for X that satisfies $Y_{216}$, and if Y is given, X can be obtained in consideration of the interleaver and the convolutional encoder.

One method of finding X that satisfies this among various solutions is as follows. Among 648 output bits of Y, 540 bits including 216 bits previously selected are selected and referred to as $Y_{540}$, and the corresponding PC matrix is referred to as $(PC)_{540}$. In this case, the selection is made such that $(PC)_{540}$ is full rank. Similar to the above, $(PC)_{540}X=Y_{540}$. $(PC)_{540}$ is full rank and is a square matrix, and thus there is an inverse matrix. Then, since $X=((PC)_{540})^{(-1)}Y_{540}$, X can be found.

Scrambling is an XOR operation with a scrambling seed sequence of a given bit sequence. That is, during Wi-Fi encoding, X can be obtained from an XOR operation between a scrambling sequence obtained from a scrambling seed and payload bits. Also, payload bits can be obtained by performing an XOR operation between X, which is the result of the XOR operation, and the scrambling sequence input to the XOR operation. As an example, the scrambling seed may be found from a commercial WNIC. For example, the widely used Atheros WNIC (e.g., AR9380) increases the seed by one per packet transmission.

Figure 10A:
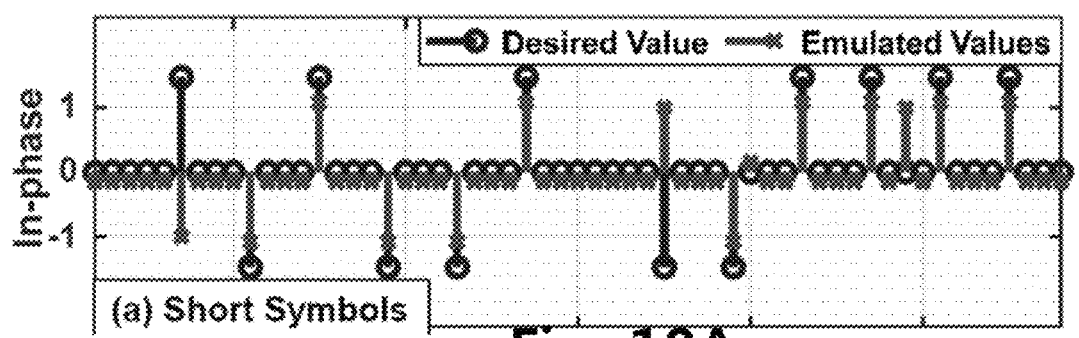
FIGS. 10A and 10B are diagrams showing an example of displaying a Wi-Fi header emulated by an initiator in a frequency domain.
Figure 10B:
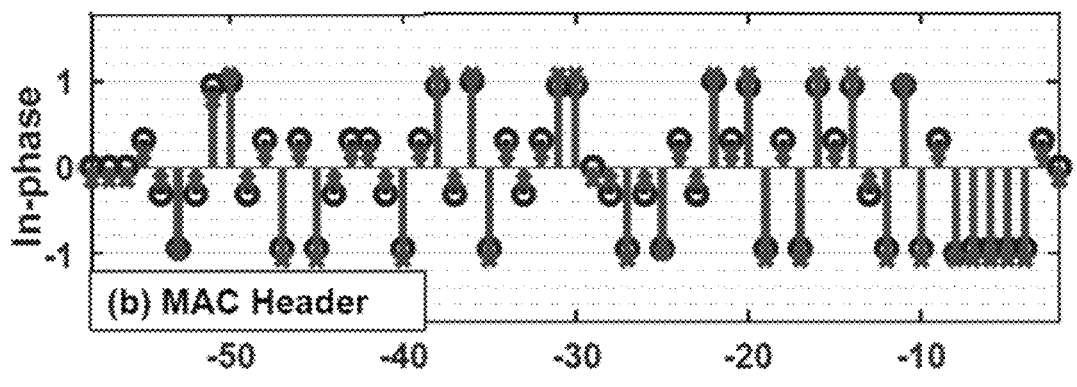

FIGS. 10A and 10B are diagrams showing an example of displaying a Wi-Fi header emulated by an initiator in a frequency domain. FIG. 10A shows an emulation result for short symbols, but long symbols and PHY are modulated with BPSK and are similar to those shown in FIG. 10A. FIG. 10B show an emulation result of a MAC modulated with 16 QAM. Referring to FIGS. 10A and 10B, signals exhibit emulation errors at different constellation points.

According to the Wi-Fi standard, three pilot subcarriers correspond to a symbol of the emulated Wi-Fi header, and pilot subcarriers are coerced by hardware and thus cannot be changed. That is, the pilot subcarrier values cannot be controlled, and when the values do not correspond to the emulated header, the pilot subcarriers may cause errors. Therefore, the error should be minimized in consideration of a symbol index in which the header emulation is started.

The emulation errors are minimized using a sequence of pilot values most corresponding to the emulated value. That is, as shown in FIG. 3, the Wi-Fi header is sequentially composed of a preamble field including ten short symbols and 2½ long symbols, a PHY field, and a MAC field. In this case, the header emulation is started from the third symbol. Therefore, as illustrated above in FIG. 4, the third and fourth symbols are emulated as short symbols, the fifth and sixth symbols are emulated as long symbols, the seventh symbol is emulated as a PHY symbol, and the eighth symbol is emulated as a MAC symbol.

In this way, the pilot and the emulated header have eight of nine matching values, and the influence of the single mismatching could be ignored. That is, it is possible to minimize the influence of a pilot mismatch by emulating a header starting from the third payload symbol.

The device 20 collects an ambient signal following the header He emulated, hidden in a payload, and provided by the initiator 10 and reconstructs the ambient signal to conform to the 802.11g signal type. However, since the ambient signal cannot be said to conform to the 802.11g signal type, an error may occur between the actual ambient signal and the reconstructed signal.

When the device 20 receives the emulated header, the device 20 starts to receive an ambient signal during LENGTH period defined in the PHY field and outputs a decoded bitstream. Here, LENGTH may be a maximum of 2,304 bytes in the Wi-Fi. When a bit sequence is given, an ambient signal is reconstructed according to Wi-Fi encoding including modulation, interleaving, and scrambling due to a one-to-one mapping relationship between payload bits and physical layer signals. Between the reconstructed signal and the actual signal, errors and phase rotation due to Wi-Fi hardware are inevitable. Hereinafter, a method of maximizing the correlation between an original signal and a reconstructed signal by selectively utilizing various error causes and signal parts (e.g., a white box in FIG. 12) will be described below.

Figure 11:
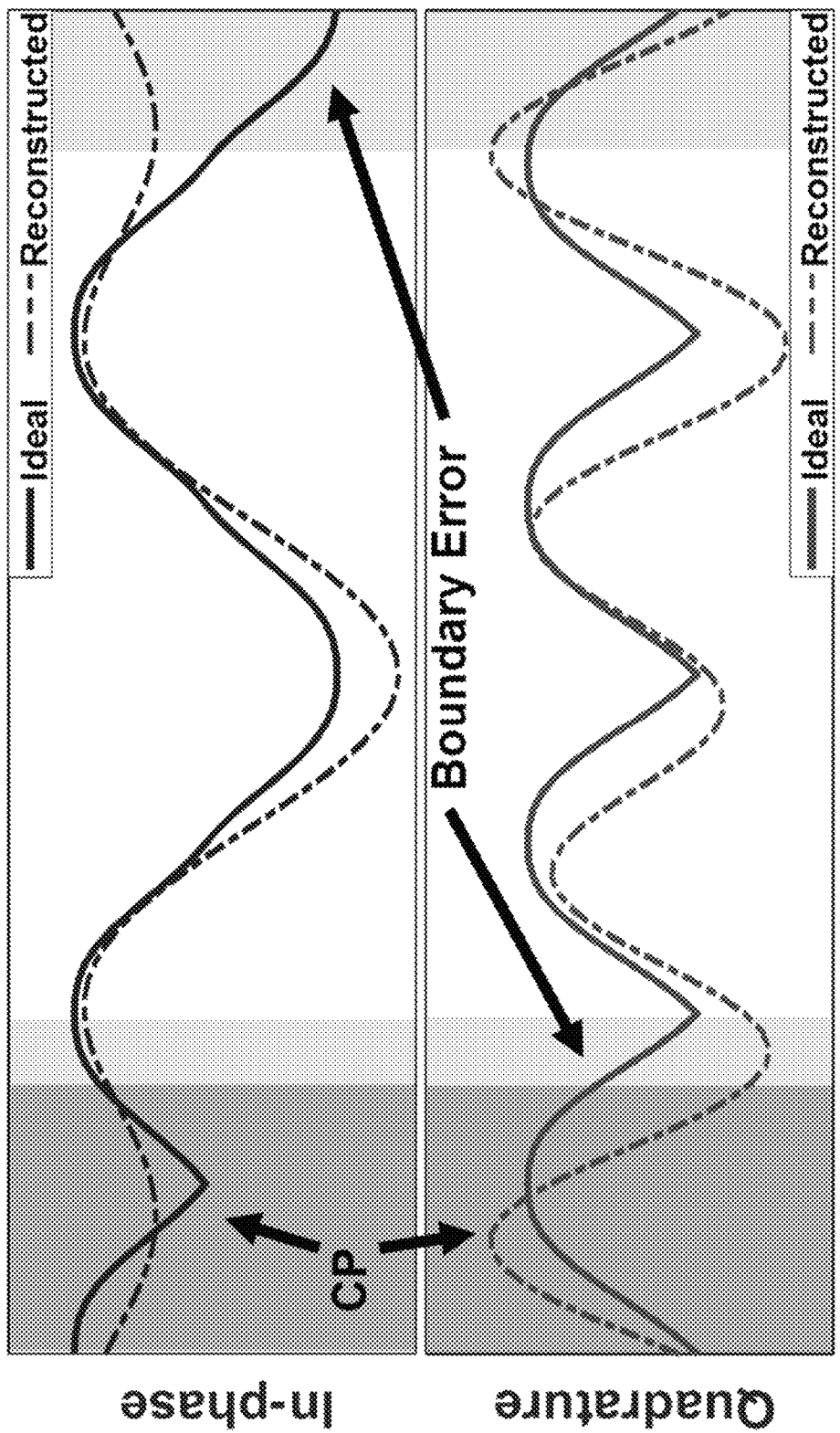
FIG. 11 is a diagram showing an error between a reconstructed signal (shown in dashed lines) and an actual ambient signal (shown in solid lines).

FIG. 11 shows an error between a reconstructed signal (shown in dashed lines) and an actual ambient signal (shown in solid lines). Referring to FIG. 11, one of the error causes is the first CP of 0.8 μsec in a part shown in dark gray in FIG. 11. Since the first CP part of 0.8 μsec is overwritten by the last 0.8 μsec of the symbol through the Wi-Fi protocol, an original ambient signal located in the CP is lost.

Another error cause is a boundary error shown in light gray in FIG. 11. This occurs due to the cyclical characteristic of the Discrete Fourier Transform (DFT) in which the start and end of a symbol must always be the same, and thus the symbol boundary of the reconstructed signal deviates from the original signal.

The reconstructed signal is expressed using Equation 3 below.

$$\Sigma_k X[k] e^{j2\pi kn/T}, x[0] = x[T].$$ [Equation 3]

T is a symbol duration.

A boundary error is inversely proportional to bandwidth because high-frequency signals better tolerate abrupt changes in a short period of time, and as the bandwidth increases, the boundary error decreases. That is, when $f_H$ is the highest frequency component in the signal (e.g., 1 MHz of Zigbee), the boundary error and the CP error may be set to $1.5/f_H$ ((=1.5 μsec, Zigbee), and thus 0.86 may be obtained as the correlation between the reconstructed signal and the ideal signal.

The reconstructed signal is also phase-rotated due to ambient noise in pilot subcarriers. The Wi-Fi compensates for the phase difference between a received pilot subcarrier and a reference value to remove a phase error by rotating the I- and Q-axes. However, in the device 20, the pilot subcarrier is filled with ambient noise, resulting in arbitrary phase rotation in the reconstructed symbol. The phase rotation may be an issue in some applications (e.g., decoding), but not in other applications (e.g., RF fingerprinting and spectrum monitoring).

The reconstructed signal approximates the original signal and maintains device-specific characteristics. This indicates that the reconstructed signal may be used for RF-device identification (RF fingerprinting). Despite arbitrary symbol phase rotation, the entire symbol is rotated by a fixed phase shift, so that a relative phase between subcarriers is kept consistent with the original signal.

Amplitude is not affected by phase rotation. In other words, the amplitude of and the relative phase between the subcarriers of the emulated signal directly reflect the physical layer signature of the original signal. The device utilizes this attribute to enable RF fingerprinting that can identify various devices using the widely used Wi-Fi.

An example of performing spectrum monitoring using this embodiment will be described with reference to FIG. 12. FIG. 12 is a diagram showing a signal waterfall that may be used for spectrum analysis. The spectrum monitoring investigates the various activities of a wireless channel through segmented power measurements. Since power is not affected by phase rotation, the reconstructed signal may be used directly without any additional processing. The precision of the power measurement is highly dependent on how the reconstructed signal is modulated. FIG. 12A shows an example of classifying 16-QAM constellation points into three stages (black, gray, and white) according to a signal size (i.e., signal power). When higher-order QAM (e.g., ten stages for 64-QAM) is adopted, it is possible to improve precision.

Figure 12B:
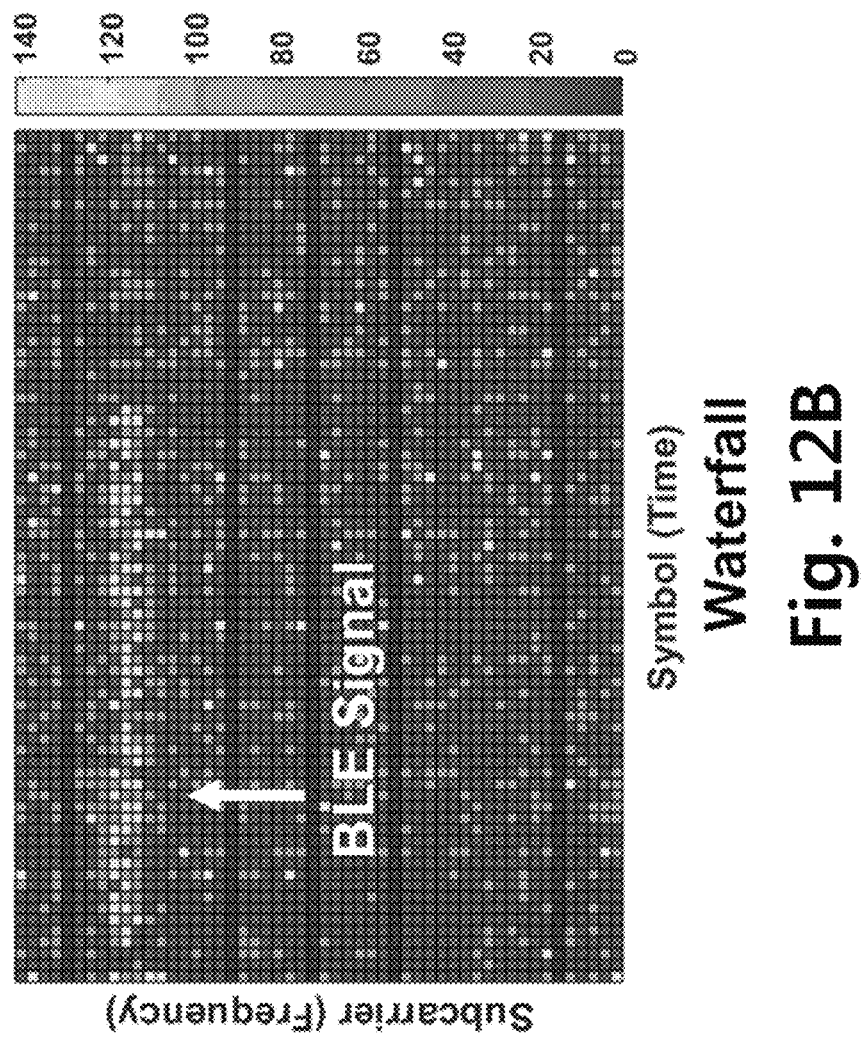
FIG. 12B is a diagram showing a signal waterfall.
Figure 12A:
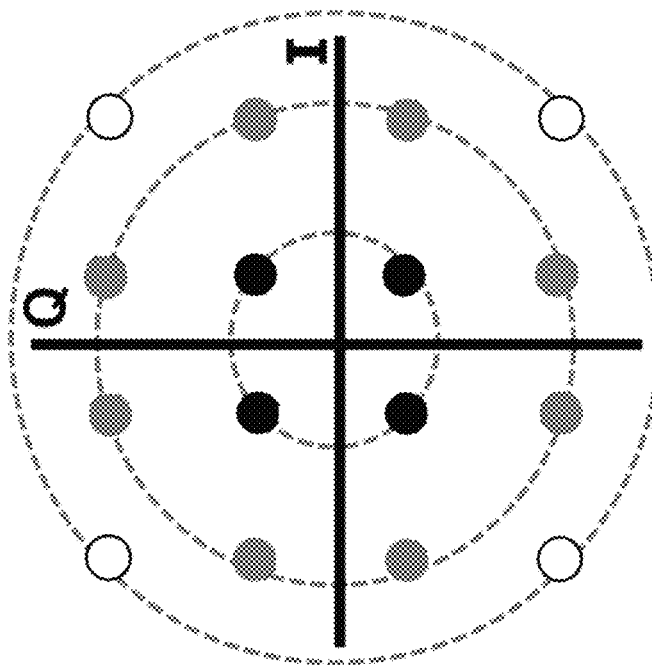
FIG. 12A is a diagram showing an example of classifying 16-QAM constellation points into three stages (black, gray, and white) according to a signal size (i.e., signal power)

Spectrum monitoring may be performed by showing signals classified in FIG. 12A according to time-frequency as shown in FIG. 12B. FIG. 12B is a waterfall plot obtained from a 16-QAM reconstructed signal obtained by capturing a signal with a length of 0.192 ms starting from the fourth symbol. From a subcarrier index in which a signal is located, the signal is identified as BLE with a bandwidth of 1 MHz and a center frequency of about 2.422 GHz (=Bluetooth Low Energy (BLE) channel 9). From FIG. 12B, spectrum monitoring having a timing precision of 4 μsec for each symbol duration and a frequency precision of 312.5 KHz for a subcarrier interval may be performed in the method according to the present embodiment.

Figure 13B:
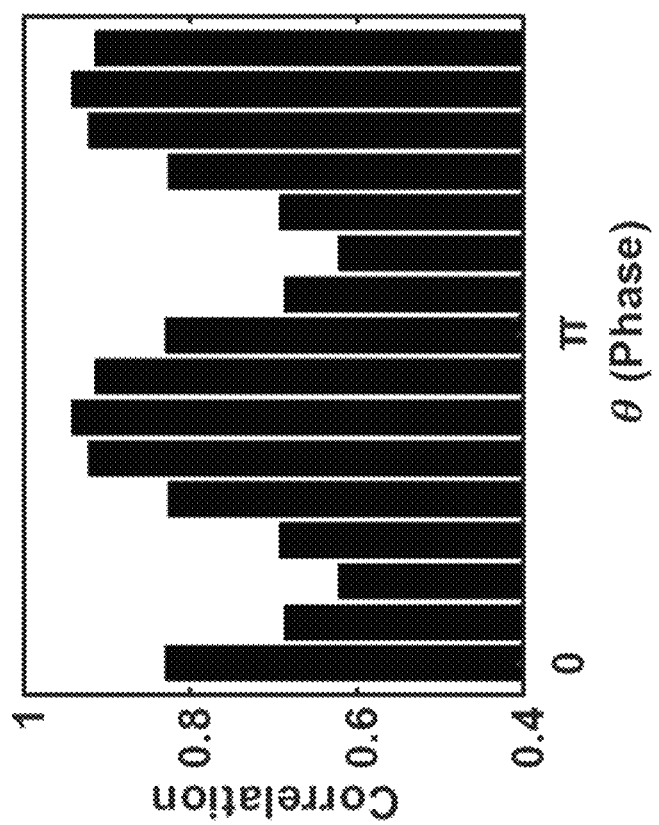
FIG. 13B is a diagram showing a change in correlation value with respect to phase.
Figure 13A:
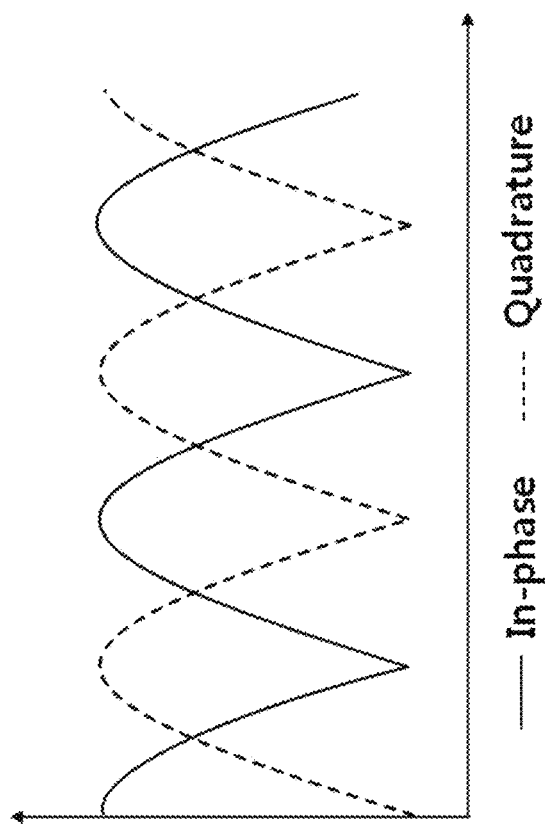
FIG. 13A is a diagram illustrating a reference Zigbee signal.

The spectrum monitoring may identify characteristics of a wireless signal, including the manner, center frequency, duration, and time of arrival of the wireless signal. The signal can be decoded from this information. A process of performing decoding on an ambient signal by the method according to the present embodiment will be described below with reference to FIGS. 13 and 14. As an example, the ambient signal exemplifies a Zigbee signal. FIG. 13A is a diagram illustrating a reference Zigbee signal, and FIG. 13B is a diagram showing a change in correlation value with respect to phase. Since typical encoding including Zigbee utilizes phase, phase rotation should be compensated for in a signal decoding process. Regardless of data indicated by a Zigbee signal, phase is compensated for by using common signal characteristics included in any Zigbee signal. By taking an absolute value of any Zigbee signal by a +/−half-sine type Zigbee signal (i.e., taking | | for in-phase and quadrature components), FIG. 13A can be obtained. This signal is used as a reference signal for phase compensation. First, the absolute value of the reconstructed signal is taken, and phase rotation is performed by θ. Subsequently, a correlation with the reference signal of FIG. 13A is computed, and the correlation computation is performed for each different θ, which can be expressed using Equation 4 below.

$$\underset{\theta}{\mathrm{argmax}}\ \mathrm{Corr}(R(t), |I\{x(t)e^{j\theta}\}| + j|Q\{x(t)e^{j\theta}\}|).\quad\text{[Equation 4]}$$

R(t) and x(t) are a reference signal and a phase-rotated signal, respectively, and θ is increased, for example, by π/8. This compensates for symbol phase rotation of −θ. FIG. 13B shows that a maximum correlation computation value of 0.93 can be obtained at (3π)/4 and π+(3π)/4. This result is because the absolute value of the signal is equal to a phase shift of π. That is, |{x(−t)e^{jθ}}|=|{x(t)e^{jθ}}|, and this is the same with the quadrature component.

One peak of two peaks shown in FIG. 13B is selected utilizing the direct sequence spread spectrum (DSSS) of Zigbee. That is, signal sequences are predefined in the DSSS, and signal sequences inverse to each other are not included in the predefined signal sequences. Therefore, the signal sequences defined in the DSSS include only one of the two candidates (i.e., (3π)/4 and π+(3π)/4), and symbol phase rotation may be corrected by selecting the defined signal sequences.

Figure 14B:
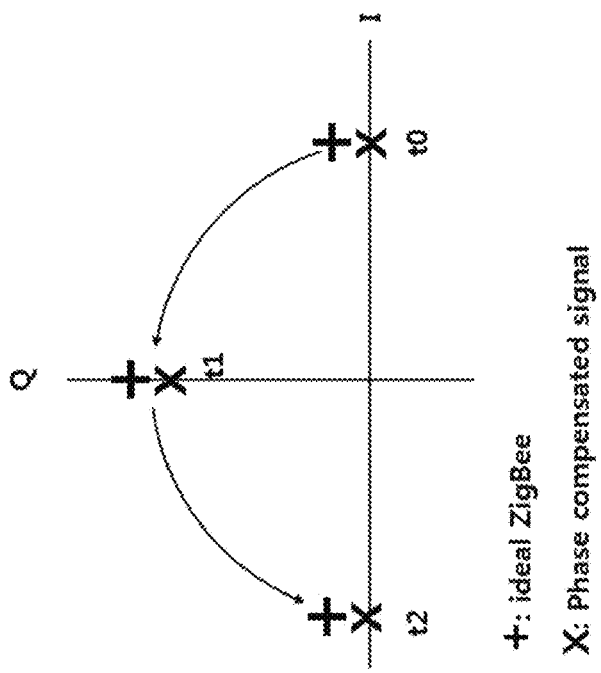
FIG. 14B is a diagram showing a result in which a phase-compensated Zigbee signal is mapped to the same bit.
Figure 14A:
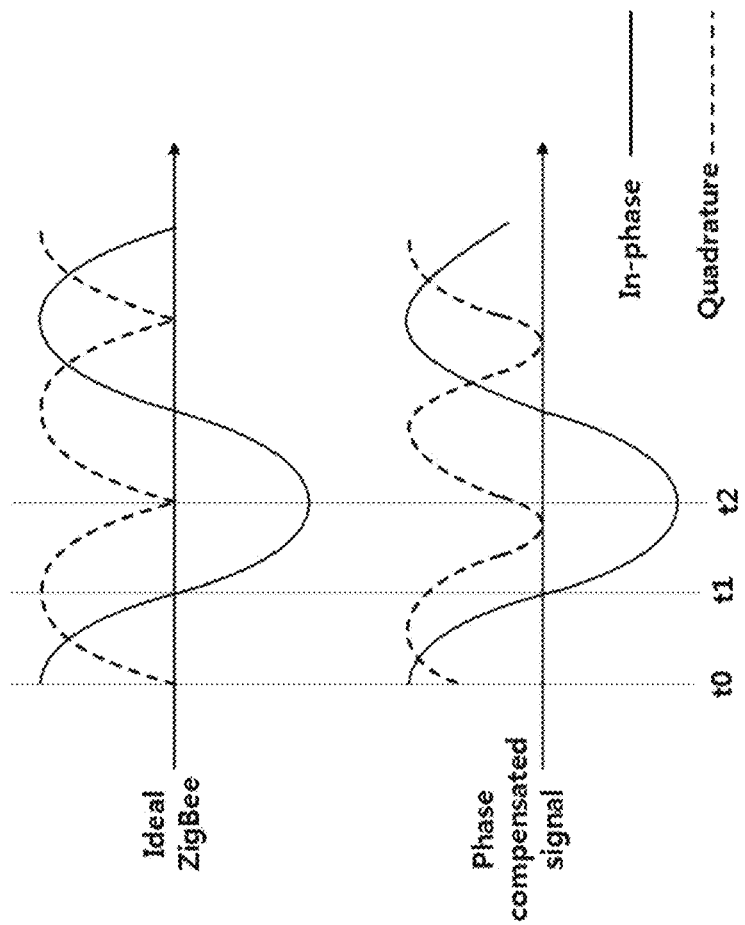
FIG. 14A is a diagram showing an ideal signal and a phase-compensated signal.

FIG. 14A shows an ideal signal and a phase-compensated signal, and FIG. 14B shows a result in which a phase-compensated Zigbee signal is mapped to the same bit. In Zigbee, a clockwise or counterclockwise phase shift represents 1 or 0, where the phase-compensated signal is decoded into correct bits (i.e., two consecutive bits). Also, by mapping to a DSSS signal sequence, it is possible to simultaneously compensate for the influence of the CP and boundary errors.

Evaluation

Extensive experiments were conducted to evaluate the present embodiment in various situations. The experimental environment includes an initiator 10 and a device 20, and the initiator 10 transmits a 40 MHz Wi-Fi packet including an emulated header at 2.426 GHz shifted by 1 MHz on Wi-Fi channel 4. The device 20 receives the emulated header at 2.417 GHz (Wi-Fi channel 2). A commercial WNIC Atheros AR9380 and universal software radio peripheral (USRP) B210 were used as the initiators 10, and D-Link DWA-192 and Alfa AWUS036ACM were used as the devices 20.

Based on the distance between the initiator 10 and the device 20, the basic performance of this technique was evaluated in terms of the type of the emulated header and the performance of the packet reception rate (PRR). AR9380 and Alfa AWUS036ACM were used as the initiator and the device, respectively.

Figure 15:
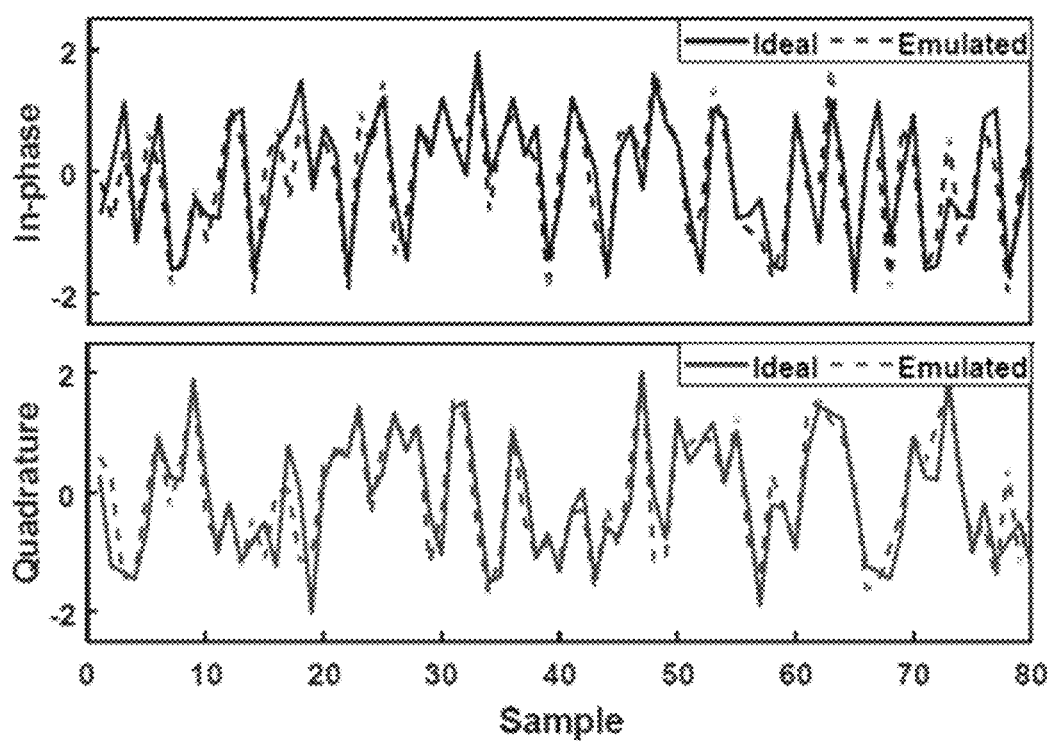
FIG. 15 is a diagram showing an ideal signal and a signal type emulated in a time domain.

FIG. 15 shows an ideal signal and a signal type emulated in a time domain. It can be seen that despite an emulation error, there is a high similarity between the emulated signal and the ideal signal. Therefore, a commercial Wi-Fi receiver may detect and decode an emulated header.

In order to evaluate the PRR, the initiator was set to transmit a 40 MHz 802.11n packet with a transmission power (Tx power) of 18 dBm. The packet includes a payload of a 16 QAM ¾ code rate, and the payload includes a header emulated in 802.11g. AR 9380 and USRP were used as initiators to hide the emulated header in the 40 MHz 802.11n packet and transmit the 40 MHz 802.11n packet. The device received the emulated header two meters apart from the initiator.

Figure 16B:
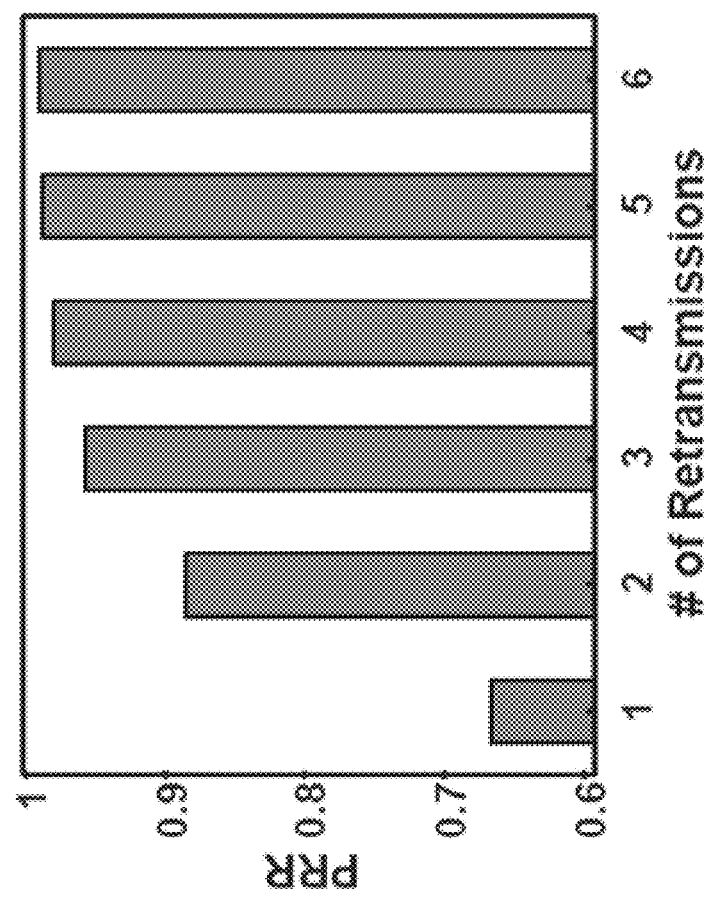
FIG. 16B is a diagram showing a PRR according to the number of retransmissions.
Figure 16A:
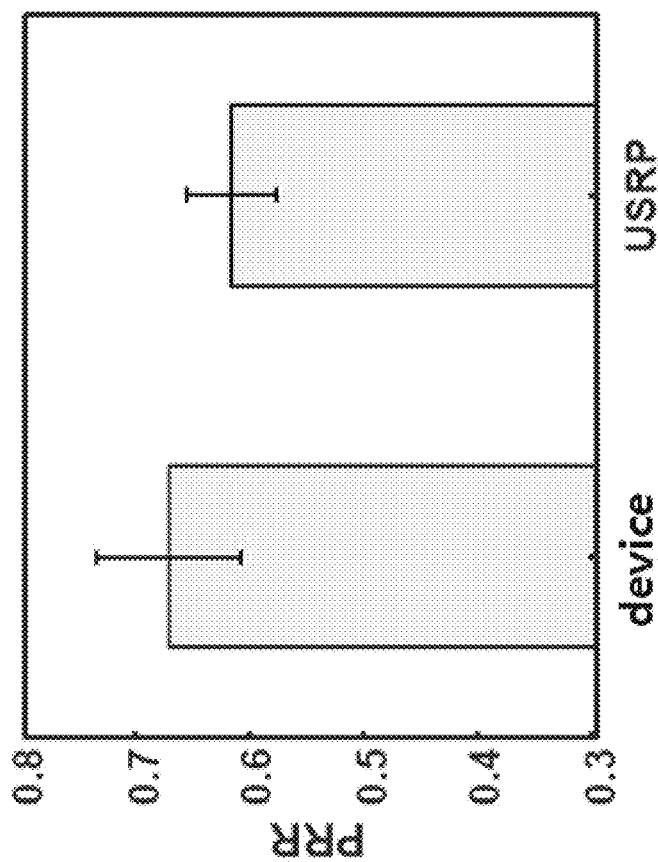
FIG. 16A is a diagram showing the packet reception rate (PRR) of a commercial WNIC and a device according to the present embodiment.

FIG. 16A is a diagram showing the PRR of a commercial WNIC and a device according to the present embodiment, and FIG. 16B is a diagram showing a PRR according to the number of retransmissions. Referring to FIG. 16A, it is shown that the commercial WNIC has a PRR of up to 67% but a USRP used as the initiator is only up to 62%. The PRR of the USRP, which is an initiator, is lower than the PRR of the commercial WNIC because Carrier-Sense Multiple Access with Collision Avoidance (CSMA/CA) is not performed. The PRR performance may be improved through retransmissions as shown in FIG. 16B. By retransmitting the emulated header four or more times, it is possible to achieve the PRR performance of 99% or higher.

Figures 17A, 17B:
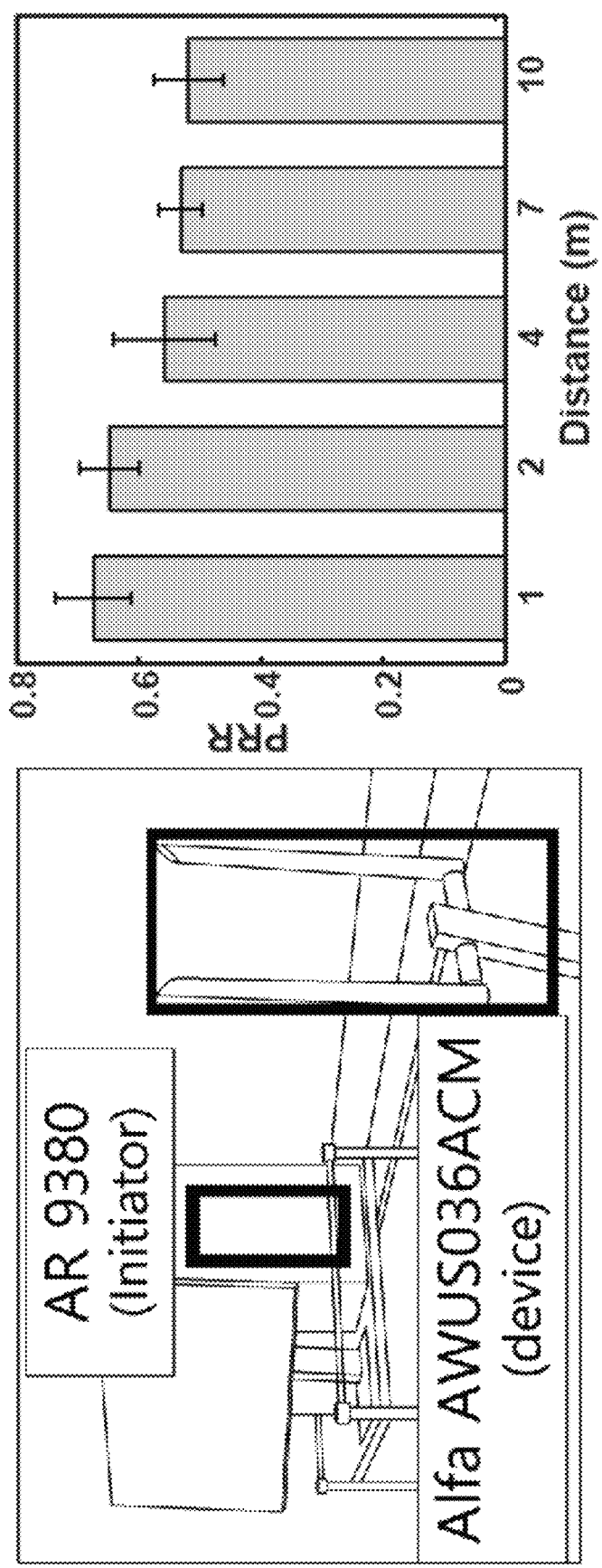
FIG. 17A is a diagram showing experiment settings of a line-of-sight (LOS) scenario.
FIG. 17B is a diagram showing a PRR in a LOS scenario.

FIG. 17A is a diagram showing experiment settings of a line-of-sight (LOS) scenario, and FIG. 17B is a diagram showing a PRR in a LOS scenario. In order to verify the performance of SDR-Lite in various scenarios, both line-of-sight (LoS) and non-line-of-sight (NLoS) are considered. First, when TX power is 18 dBm in the LOS scenario as shown in FIG. 17A, a PRR was measured while increasing the distance between the initiator and the device. As shown in FIG. 17B, the PRR performance measured at the nearest distance (1 meter) was up to 67%, whereas the PRR decreased to 52% at 10 meters as a signal-to-noise ratio (SNR) was reduced. However, by retransmitting the emulated header five times, the PRR reached 95% at 10 meters.

FIG. 18A shows various positions (A) to (D) of a device fixed in an NLoS environment in which the initiator 10 is fixed to a desk. FIG. 18B is a diagram showing a PRR for each position. As shown in FIG. 18B, the PRRs at (C) and (D) are 52% and 55%, respectively, whereas the PRRs at (A) and (B) are 47% and 52%, respectively. This is because the positions of (A) and (B) are farther from the initiator 10 than the other positions, and when the emulated header is transmitted again, all users in the NLoS scenario can obtain a PRR of 95%.

An emulated header signal transmitted by AR 9380 and a Zigbee signal transmitted by CC2650 were recorded using the USRP, and then, for convenience, the linked signal was transmitted from the USRP to the device. FIG. 19A shows the maximum correlation value between a reconstructed Zigbee signal and an ideal Zigbee signal when Tx power changes from −10 dBm to 10 dBm. FIG. 19B is a diagram showing the maximum correlation value between a reconstructed BLE signal and an ideal BLE signal under the same conditions. As shown in FIGS. 19A and 19B, when an SNR was sufficiently high, the maximum correlation value of Zigbee and the maximum correlation value of BLE reached 0.86 and 0.85, respectively. It is shown from the experiment results that a signal received by the device may be successfully reconstructed to recover an original signal as illustrated in FIG. 20.

FIGS. 20A and 20B show phase-corrected signals of Zigbee and BLE formed by performing the above-described phase compensation. As shown, since a reconstructed signal shown in solid lines and an ideal signal shown in dashed lines exhibit high similarity, and an original payload may be decoded from the reconstructed signal.

Figure 21:
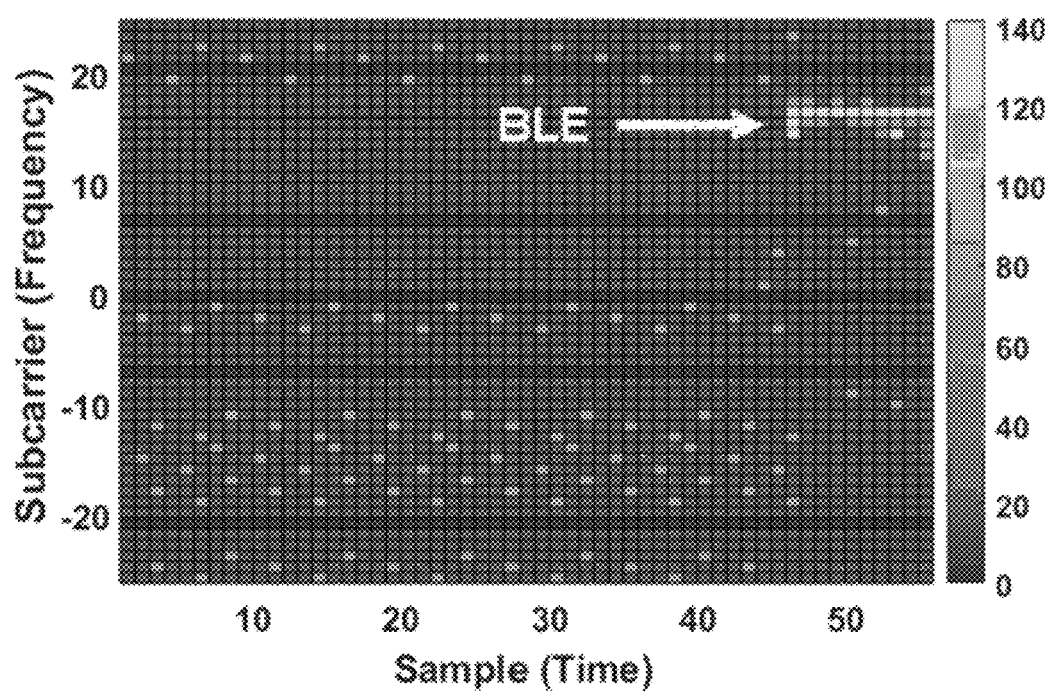
FIG. 21 is a diagram showing that a device captures a BLE signal transmitted at 2.422 GHz.

A method of analyzing the spectrum of an ambient signal using the present embodiment will be described below with reference to FIGS. 21 to 23. An RF spectrum may be monitored in an ISM band using AR 9380 or USRP as the initiator 10 and D-Link DWA-192 as the device 20. CC2650, which conforms to the standard, was used as a Zigbee/BLE device.

To analyze the RF spectrum, the device may measure the power of an RF signal by performing waterfall plotting on various RF activities. When an emulated header sent by the initiator 10 is received, the device 20 monitors an RF spectrum at 2.417 GHz with a bandwidth of 20 MHz. FIG. 21 shows that the device 20 captures a BLE signal transmitted at 2.422 GHz. Here, the x-axis represents the time domain expressed in Wi-Fi symbol units (4 µsec), and the y-axis represents the frequency domain in subcarrier units (0.3125 kHz).

The RF power measured by the device differs depending on the power of the emulated header. In order to evaluate the influence of the power of the emulated header, the emulated header and the ZigBee/BLE signal were recorded in the USRP and then transmitted to the device after the power ratio of the emulated header to BLE/ZigBee was changed from 16:1 to 1.6:1.

Figures 22A, 22B, 22C:
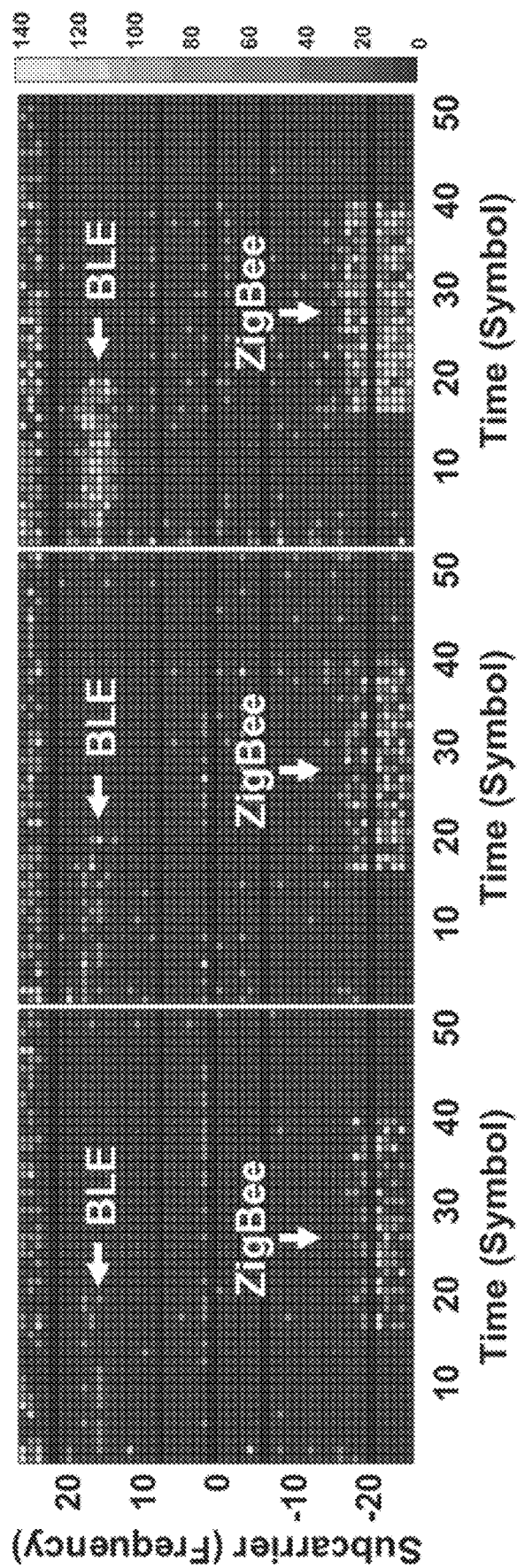
FIGS. 22A, 22B, and 22C are waterfall plots of a Zigbee signal and a BLE signal captured at the center frequency between 2.410 GHz and 2.422 GHz.

FIGS. 22A, 22B, and 22C are waterfall plots of a Zigbee signal and a BLE signal captured at the center frequency between 2.410 GHz and 2.422 GHz. In FIGS. 22A, 22B, and 22C, each plot shows more detailed power levels of a Zigbee signal and a BLE signal as the power of the emulated header decreases. When the device 20 receives an RF signal, the power of an emulated header close to the RF signal should be controlled in order to map the power of the RF signal to an appropriate QAM point.

Figures 23A, 23B:
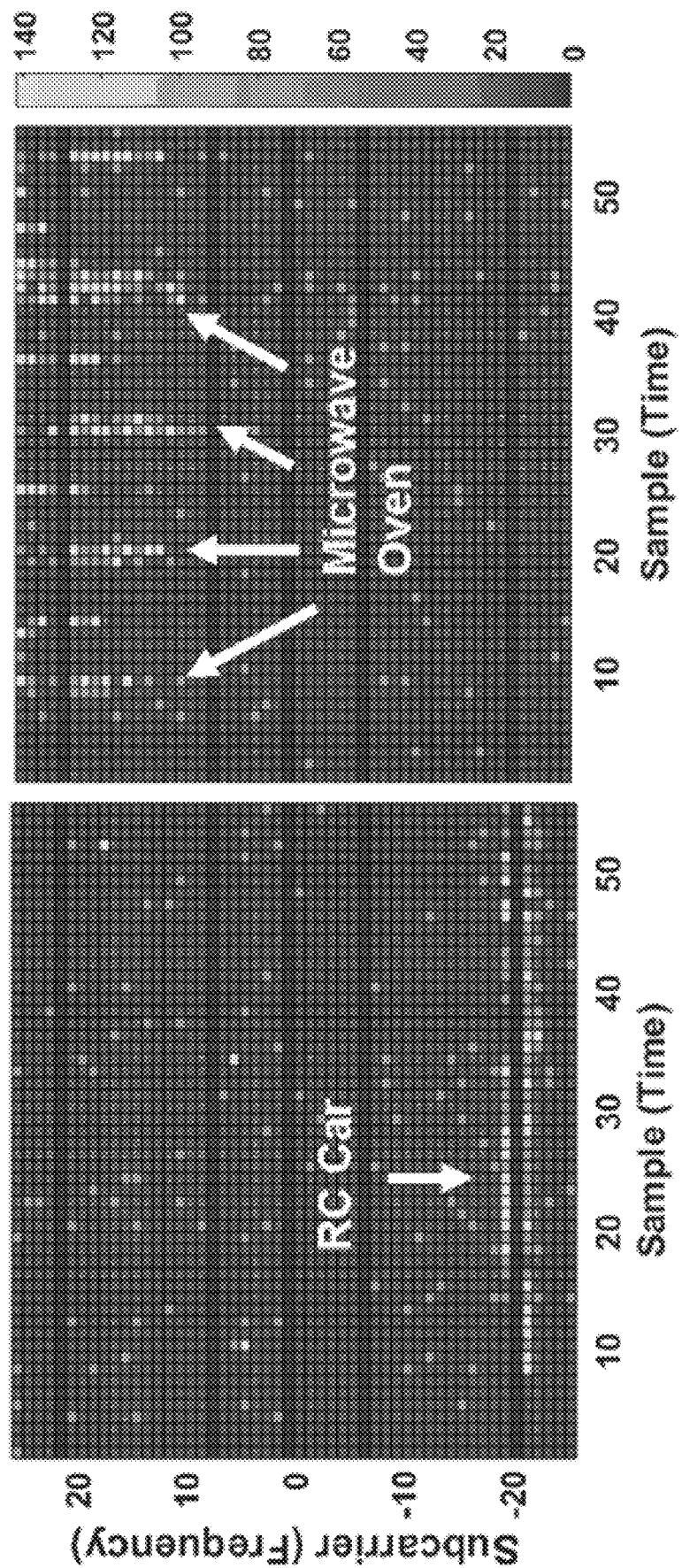
FIGS. 23A and 23B are diagrams showing waterfall plots of RF signals emitted from a remote control (RC) car and a microwave oven.

A non-wireless protocol signal may also be monitored using this embodiment. Under the same experiment settings, an RF signal is captured from a remote control vehicle and a microwave oven through the device. FIGS. 23A and 23B show waterfall plots of RF signals emitted from an RC car and a microwave oven. It can be seen that the device 20 may monitor an RF spectrum and manage a network for better spectral efficiency in an environment with various RF signals.

A method of decoding a Zigbee signal according to this technique will be described below. A symbol error rate (SER) and a frame reception rate (FRR) are evaluated. For detailed analysis, the emulated header and Zigbee signal are recorded using USRP B210 as the initiator 10, and the Zigbee signal is reconstructed and decoded using the device.

Figure 24A:
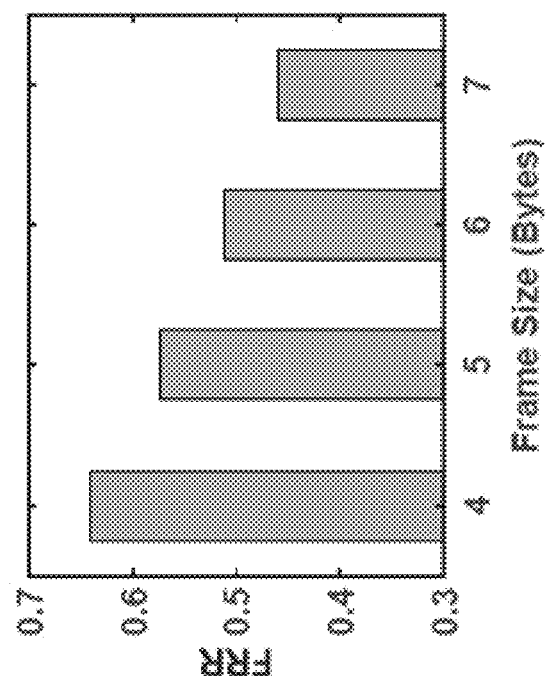
FIG. 24A is a diagram showing SER performance of an initiator when Tx power changes from −5 dBm to 10 dBm.

In order to evaluate the SER and the FRR, the emulated header and Zigbee signal recorded by the initiator, USRP, are transmitted to devices with different TX powers. The distance between the initiator 10 and the device 20 was set to two meters. FIG. 24A shows the SER performance of the initiator 10 when TX power changes from −5 dBm to 10 dBm. Since the power of the emulated header should be controlled in consideration of target signal power, the power ratio of the emulated header to the Zigbee signal was set to 16:1.

Figure 24B:
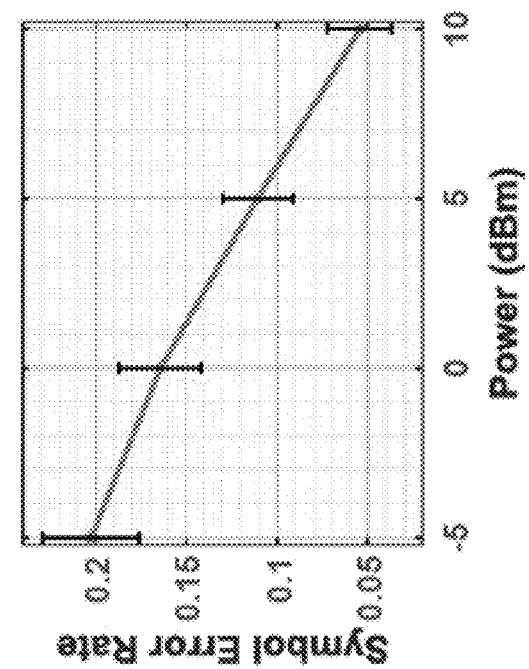
FIG. 24B is a diagram showing FRR performance with different frame lengths with respect to a TX power of 10 dBm on the basis of the SER performances.

When 10 dBm TX power is used, SER performance could reach 95% and was 80% compared to the case of −5 dBm TX power. FIG. 24B shows FRR performance with different frame lengths for a TX power of 10 dBm on the basis of the SER performance. For a frame with four bytes, the FRR performance is 64%, and as the frame length increases, the FRR decreases. This result shows that the device may decode a Zigbee symbol and a frame to convert a Wi-Fi device into a Zigbee decoder (e.g., a mobile IoT reader).

A device identification application that uses an RF signature captured by the device using a frame transient state will be described below. The frame transient state is observed at the beginning and end of each frame and is determined by a hardware manufacturing process and defects. The frame transient state includes, for example, the number of overshoots formed when a signal changes from one level to another, the percentage of a peak of an overshoot relative to the level, and/or steps required for the change. Among devices belonging to the same model, these features may be unique to a corresponding device. Consequently, this frame transient function can be used to identify and/or finger-print various Wi-Fi devices, including mobile phones and Wi-Fi access points (APs).

Figure 25:
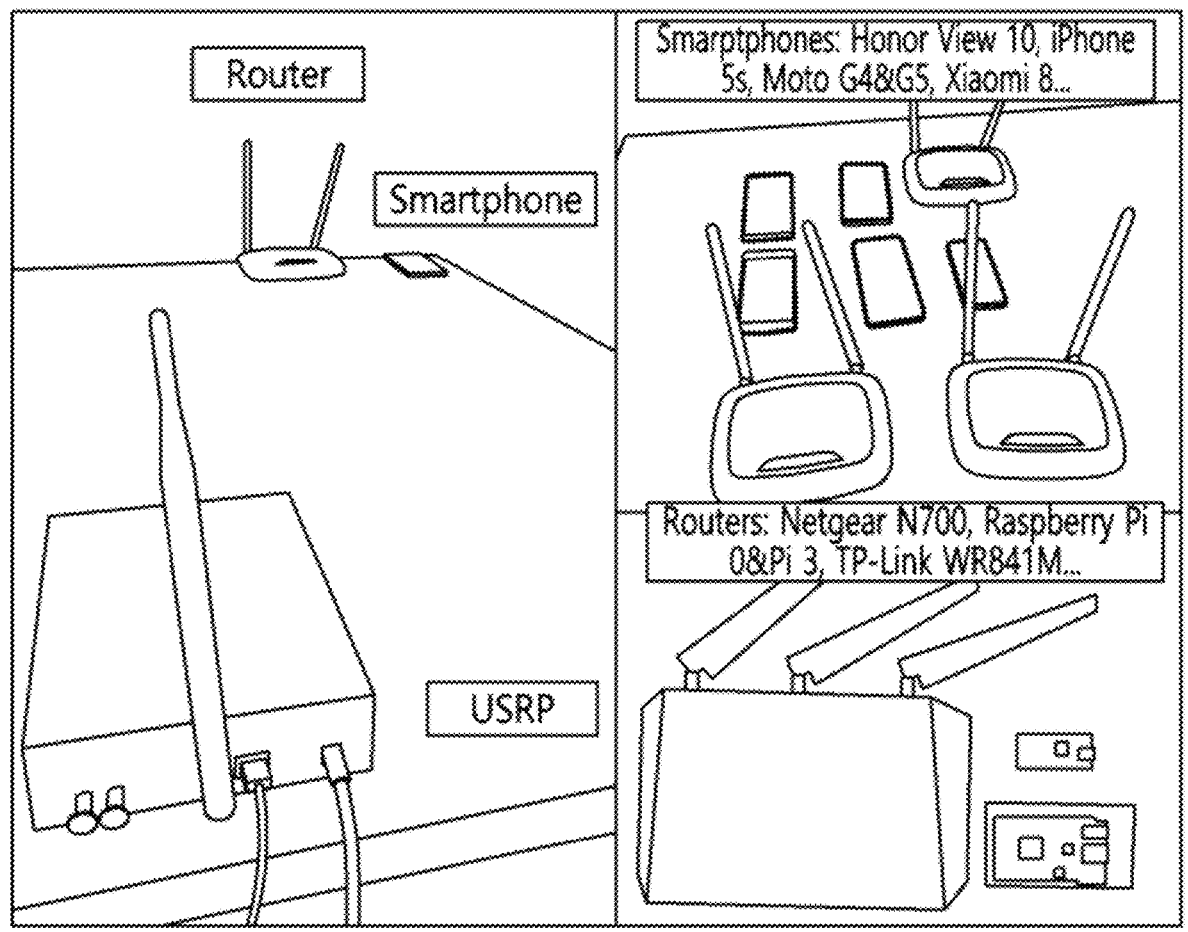
FIG. 25 is a diagram showing devices used for device identification.

Table 1 below is a table that summarizes Wi-Fi devices used in the experiment. FIG. 25 is a diagram showing devices used for device identification. During the fingerprinting process for the device, by setting the device 20 and the initiator in order to compare the performance of the device 20 and USRP, the device captures the frame transient state of a Wi-Fi signal.

TABLE 1

| Model | Quantity | Type |
| --- | --- | --- |
| Honor View 10 (M1) | 1 | Smart device |
| iPad Pro (M2) | 1 | Smart device |
| iPhone 5s (M3) | 1 | Smart device |
| Moto G4 (M4) | 1 | Smart device |
| Moto G5 (M5) | 1 | Smart device |
| Xiaomi 8 (M6) | 3 | Smart device |
| TP-Link Archer A7 (A1) | 1 | Router |
| Netgear R7000 (A2) | 1 | Router |
| Raspberry Pi 0 (A3) | 1 | Router |
| Raspberry Pi 3 (A4) | 1 | Router |
| TR-Link WR841N (A5) | 4 | Router |

Device identification requires training and testing processes. Transient signals captured by the USRP and the device 20 are used as a training set. Here, the lengths of transient signals of the USRP and the device 20 are 200 data points and 64 data points, respectively. Subsequently, another 200 samples are captured as a test set, and artificial intelligence is used to predict the device labels of the transient signals. As an example, the artificial intelligence may be any one of a support vector machine (SVM) algorithm, linear regression, logistic regression, and neural networks.

Figures 26A, 26B:
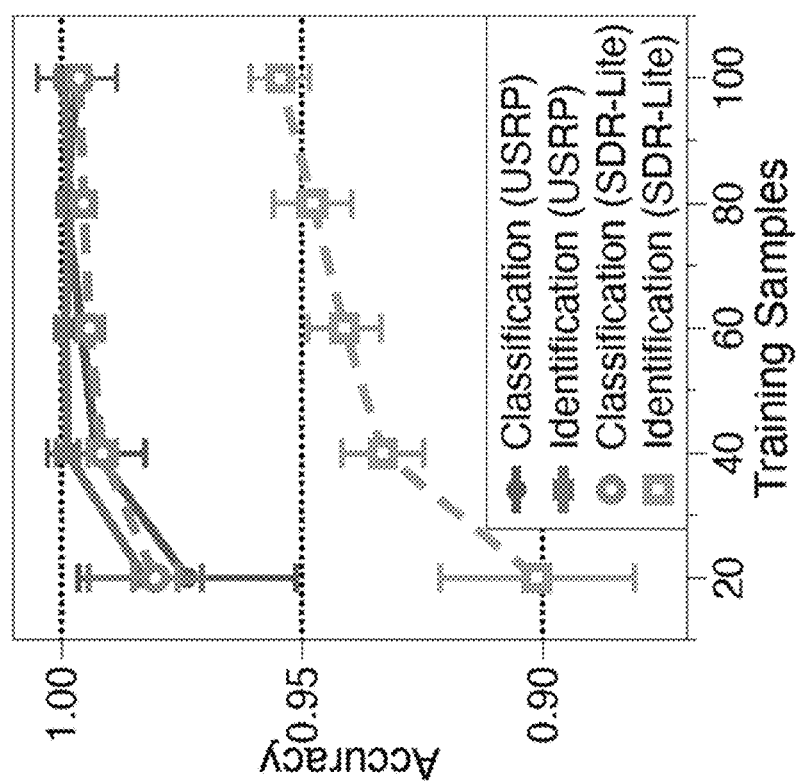
FIGS. 26A and 26B are diagrams showing a cell phone fingerprinting experiment result in which six types of smart devices (M1 to M6) including three Xiaomi 8 models (M61 to M63) are classified.
Figure 27B:
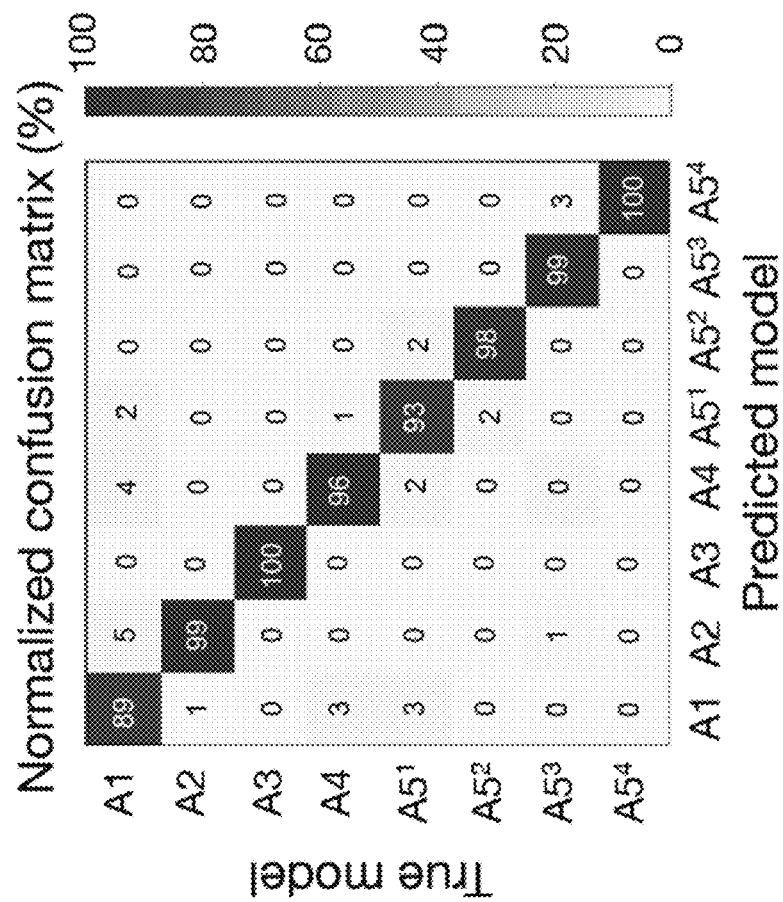
FIGS. 27A and 27B are a diagram showing a result for router fingerprinting.
Figure 27A:
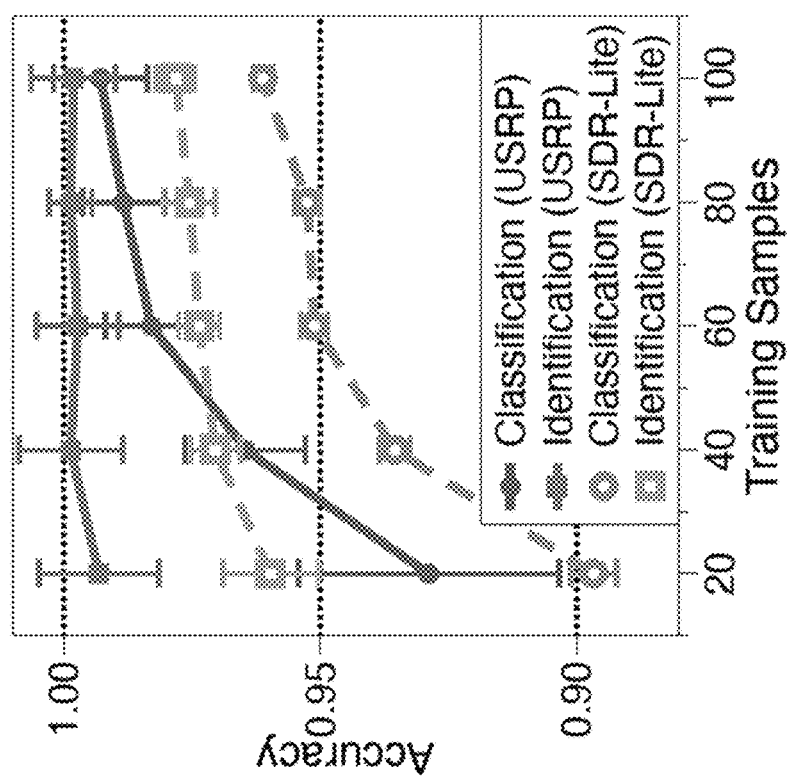

FIG. 26 is a diagram showing a cell phone fingerprinting experiment result in which six types of smart devices (M1 to M6) including three Xiaomi 8 models (M6[1] to M6[3]) are classified. FIG. 27 is a diagram showing a result for router fingerprinting. In the fingerprinting experiment for routers, five different models (A1 to A5) of routers and four TP-Link WR841N routers (A5[1] to A5[4]) were classified.

Figure 28:
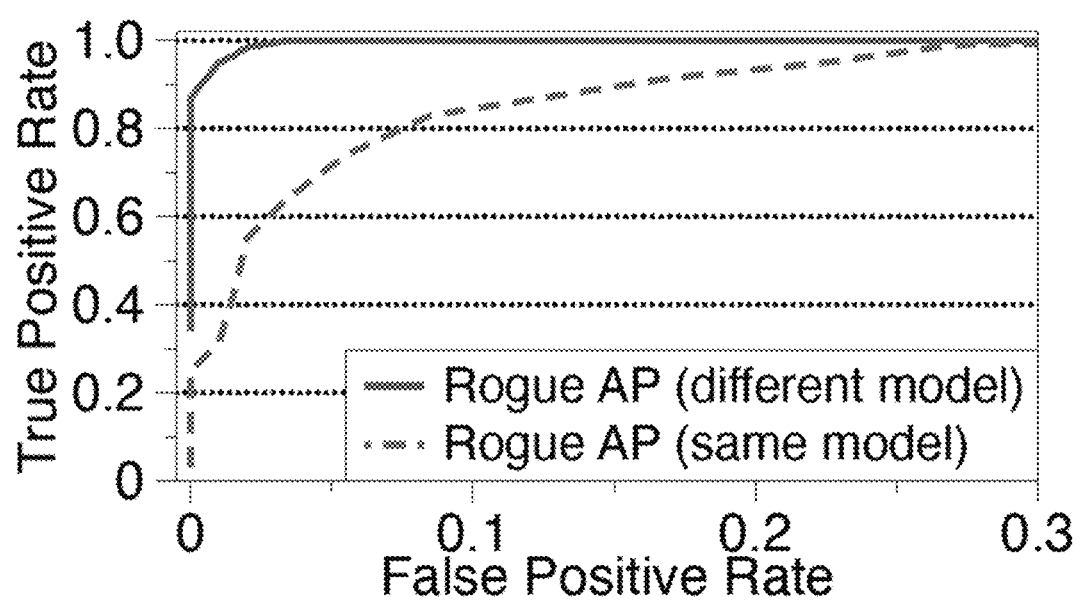
FIG. 28 is a diagram showing a receiver operating characteristic (ROC) curve.
Figure 29:
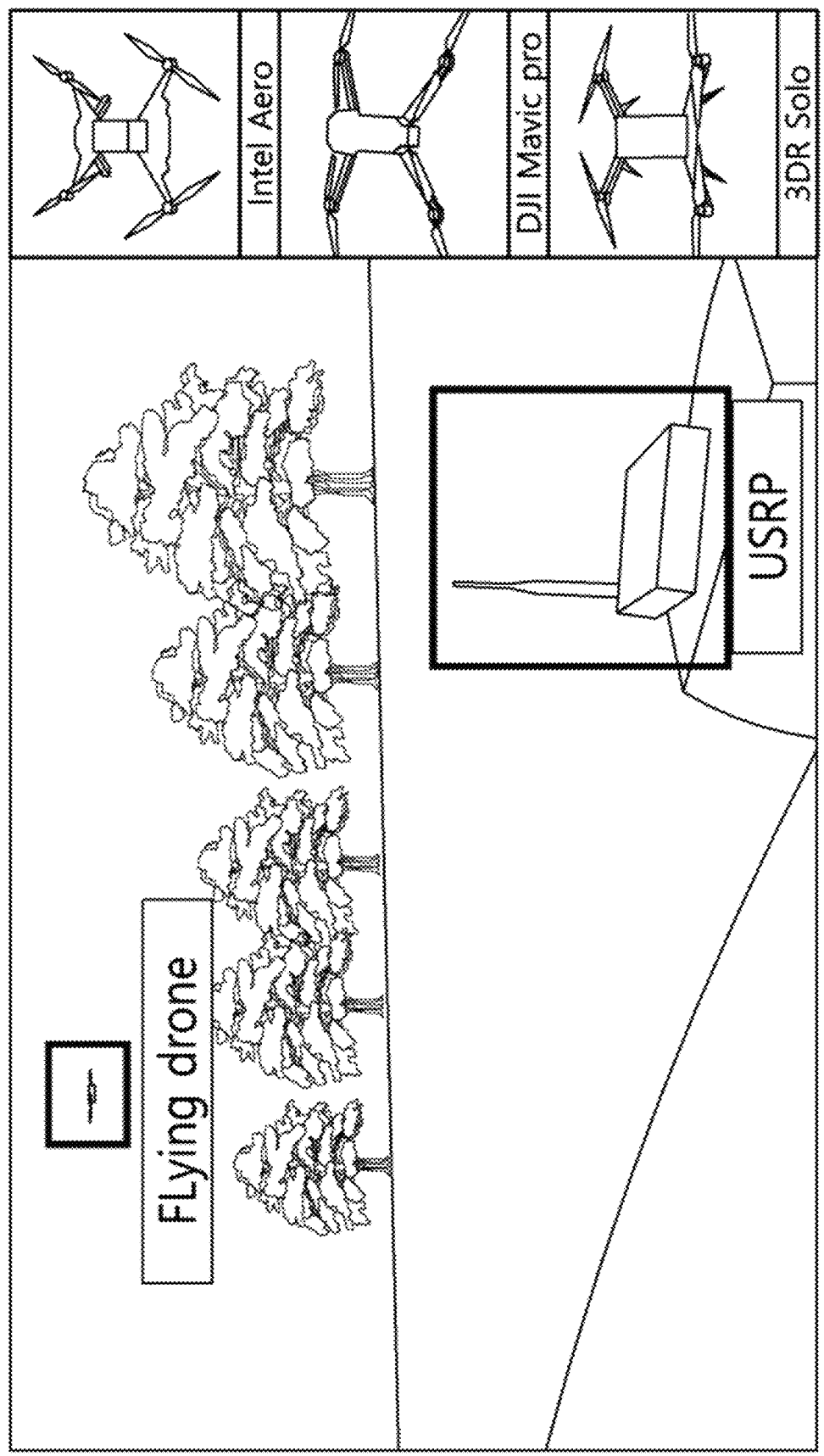
FIG. 29 shows a drone experiment scenario with three drone photos.

Classification accuracy and identification accuracy represent the accuracy of classifying different device models and the accuracy of identifying individual devices as the same model. FIGS. 28 and 29 show results in which the accuracy increases as the number of training samples increases. When sufficient training samples are given, the device 20 can achieve device classification accuracy very similar to that of the USRP.

However, in the process of identifying a device among devices belonging to the same model, the device 20 exhibits a lower accuracy than the USRP. However, this deterioration is caused by inevitable signal distortion in the reconstruction process. When 100 training frames are used, the accuracy of device identification of smartphones and routers exceeds 94% and increases significantly.

FIG. 28 shows a receiver operating characteristic (ROC) curve. A frame transient characteristic may be used to detect bad APs. Two TP-Link WR841N routers are used as legitimate APs, and 100 temporary samples are captured through the device 20 as a training set for each device. Subsequently, another TP-Link WR841N router and a Raspberry Pi Zero are selected as two bad APs, and the bad APs are detected using artificial intelligence. In this case, the artificial intelligence may be a k-nearest-neighbor (kNN) algorithm.

Referring to FIG. 28, it can be seen that high detection accuracy is achieved when the model of the bad AP is different from that of the legitimate AP. In particular, the device 20 was able to detect the Raspberry Pi rogue AP with an actual positive rate of 99% and a false positive rate of less than 3%. However, when the model of the bad AP is the same as that of the legitimate AP (i.e., WR841N), detection performance deteriorates.

Another application of this technique may be a drone detector. Commercial drones and controllers use an ISM band for message exchange (e.g., control, video streaming). For this evaluation, three representative drone models were selected, i.e., Intel Aero, DJI Mavic Pro, and 3DR Solo. Intel Aero and DJI Mavic Pro use proprietary protocols, and 3DR Solo adopts the Wi-Fi standard. Artificial intelligence that performs RF fingerprinting was introduced for drone detection. As an example, the artificial intelligence may be any one of an SVM, which is supervised learning, linear regression, logistic regression, neural networks, and a deep neural network (DNN).

FIG. 29 shows a drone experiment scenario with three drone photos. Artificial intelligence was used to analyze a time-series RF signal. As an example, the artificial intelligence has a 1D convolutional neural network (CNN) architecture. For this evaluation, we performed two tasks: (i) drone presence detection and (ii) drone model classification.

In the drone presence detection task, a drone was detected based on an RF signal by scanning a 2.4 GHz spectrum. The drone model classification is for classifying a drone model by examining an RF signal of a drone. Both the device 20 and the USRP, which is a universal SDR device, are used to scan the 2.4 GHz spectrum and capture the RF signal as an input of the DNN. The accuracy performance of each of the USRP and the accuracy performance of the device 20 with respect to capturing a drone signal in the two tasks were compared.

Figure 30B:
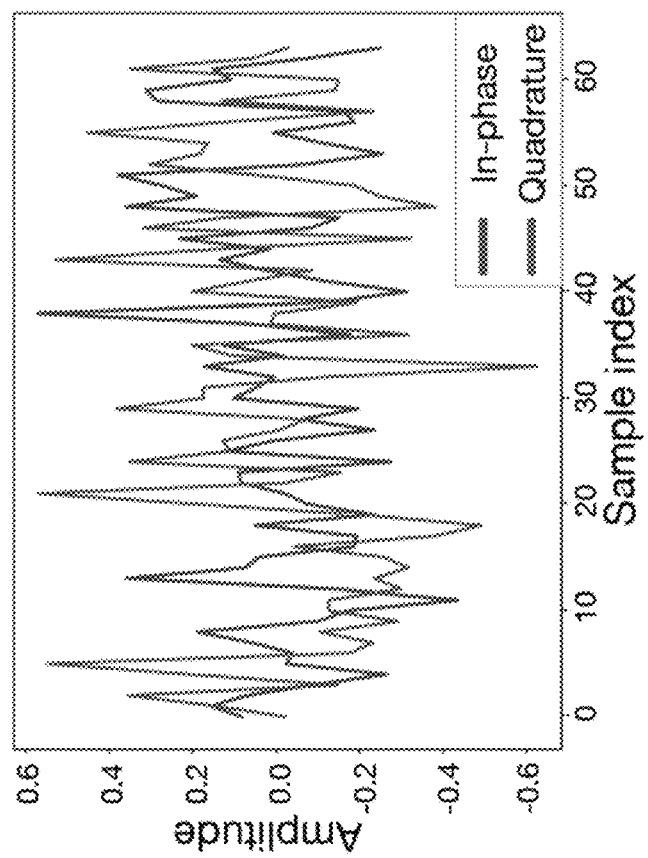
FIG. 30B is a diagram showing a signal of Solo which is reconstructed by a device.
Figure 30A:
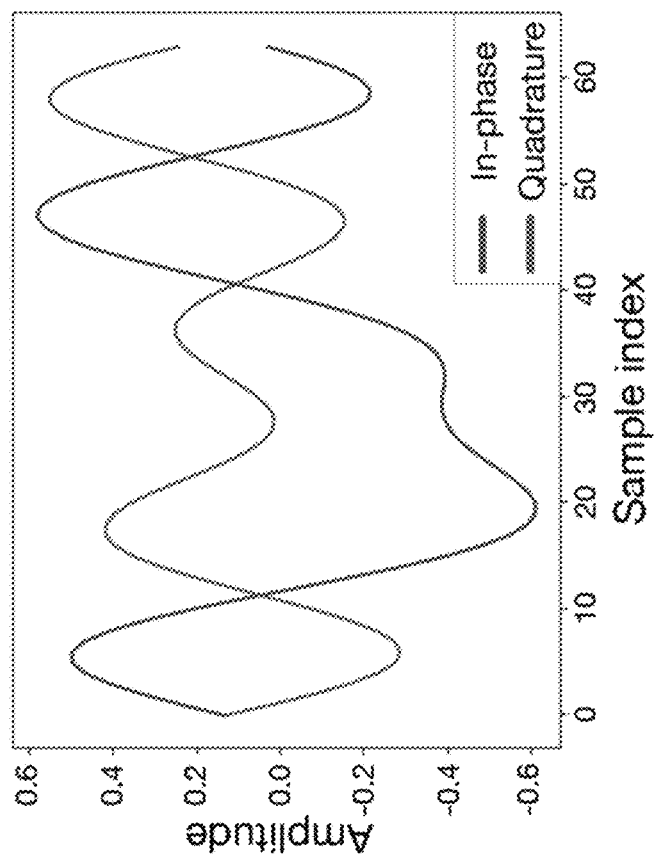
FIG. 30A is a diagram showing a signal of Mavic Pro which is reconstructed by a device.

FIG. 30A is a diagram showing a signal of Mavic Pro which is reconstructed by the device 20, and FIG. 30B is a diagram showing a signal of Solo which is reconstructed by the device 20. As shown, because different drone models, for example, Mavic Pro and Solo, generally adopt different PHY standards or modulations, their characteristics are maintained in the reconstructed signal.

In order to train the deep neural network (DNN), 600 drone RF signal samples and 600 noise samples were collected. Each RF signal sample includes 64 in-phase and quadrature points (see FIG. 30). Since the amplitudes of the RF signals are all normalized, different RF gains of the signals do not affect DNN results. After the training, 400 other test samples are used to evaluate the accuracy performance of this technique.

Figure 31:
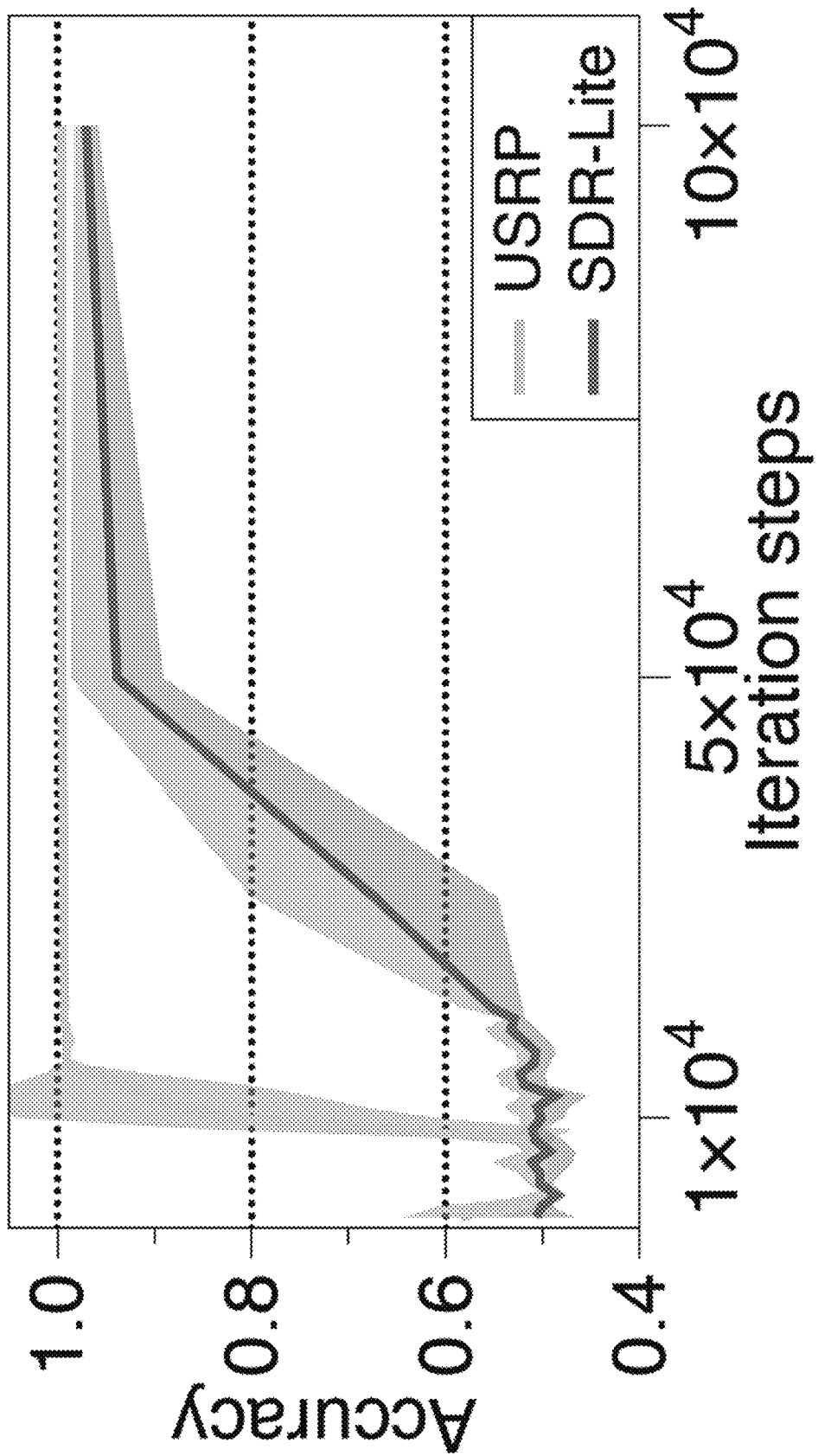
FIG. 31 is a diagram showing the accuracy of drone detection when an RF signal of a drone is captured by a device and a universal software radio peripheral (USRP).

FIG. 31 shows the accuracy of drone detection when an RF signal of a drone is captured by a device and USRP (a region shown in gray indicates the standard deviation with five random seeds). As the number of training iteration steps increases, the detection accuracy of the initiator converges to an accuracy of 99.6%. The device requires the convergence of more steps but could achieve 97%, which is performance similar to the USRP. Slight fluctuations in an original signal may be quantized due to the device's 16-QAM mapping, but the DNN may distinguish drone signals through more training steps.

By analyzing the RF signal through the DNN, three drone models could be classified. Similar to the presence detection experiment, each unmanned aerial vehicle collected 450 samples for training and 200 samples for testing.

Figure 32B:
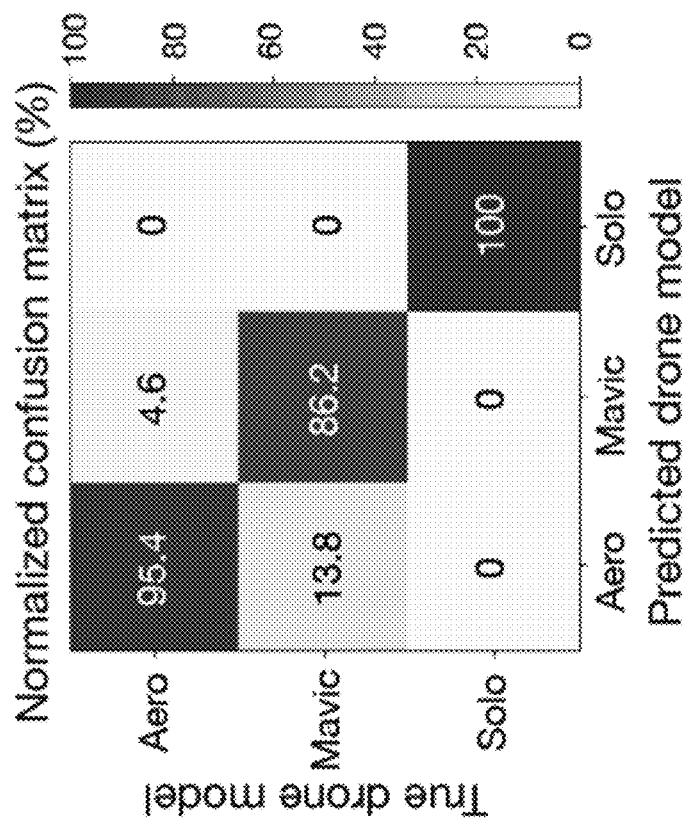
FIG. 32B is a diagram showing a confusion matrix of drone classification using a signal reconstructed by a device.

FIG. 32B shows a confusion matrix of drone classification using signals reconstructed by the device. The y-axis is an actual drone model, and an x-axis is a model predicted by the DNN. Wi-Fi3DR Solo drones can be classified without errors because the drones use only Wi-Fi signals that are significantly different from other RF signals.

Figure 32A:
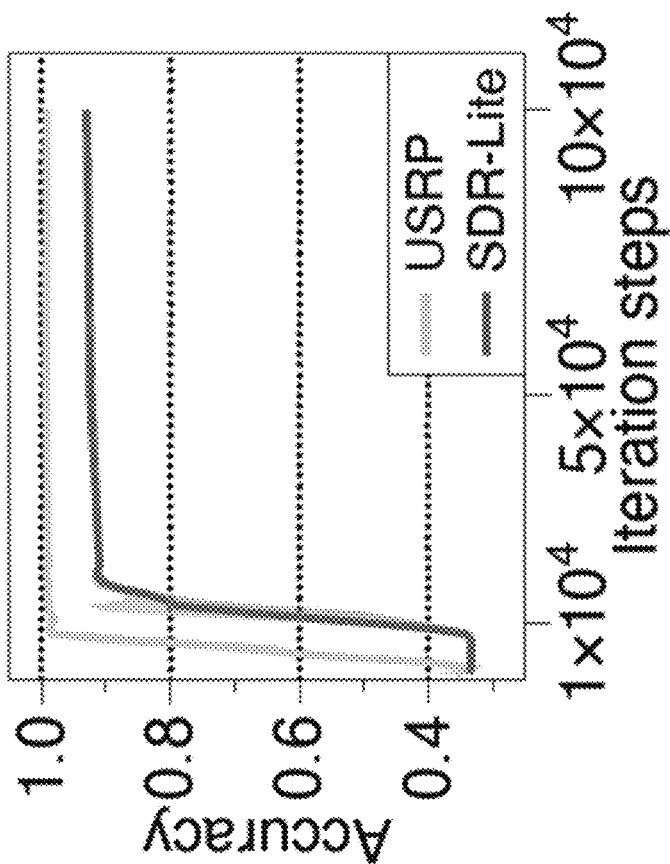
FIG. 32A is a diagram showing the performance of the USRP and device according to an increase in the number of repeated steps.

FIG. 32A shows the performance of each of the device and the USRP along with an increase in the number of iteration steps. The USRP performance achieved an accuracy of 99.3%, whereas the device was able to classify the drone model with an accuracy of 93.7%. Compared to a Wi-Fi signal of a Solo drone, when the device reconstructs RF signals of an Aero drone and a Mavic Pro drone, it is difficult to distinguish the RF signals because the RF signals are similar. The classification performance achieved by the device is 93.7%, but this classification is performed by providing a 4-μs sample to the DNN. Therefore, the accuracy can be further improved by collecting multiple samples.

The above description has been provided with reference to the embodiments shown in the accompanying drawings in order to help understand the present invention, but the embodiments are merely illustrative for implementation. Accordingly, it will be understood by those skilled in the art that various modifications and equivalents are possible. Therefore, the technical scope of the present invention should be defined by the appended claims.

The invention claimed is:

1. A wireless device driving method comprising:
   hiding a header emulated with a second protocol in a payload of a packet defined with a first protocol and transmitting the emulated header at a transmission side;
   receiving the emulated header and an ambient signal at a reception side; and
   decoding the ambient signal according to the second protocol to obtain a bit sequence, wherein
   the first protocol is 802.11n,
   the second protocol is 802.11g
   the emulated header includes a preamble field including ten short symbols and 2.5 long symbols,
   two payload symbols of the first protocol are emulated to the ten short symbols of the second protocol,
   two payload symbols of the first protocol are emulated to the 2.5 long symbols of the second protocol.

2. The wireless device driving method of claim 1, wherein the emulated header has a center frequency different from a center frequency designated for the packet defined with the first protocol.

3. The wireless device driving method of claim 1, wherein
the preamble field further includes a PHY field and a MAC field, and
the PHY field and the MAC field are each emulated as one payload symbol.

4. The wireless device driving method of claim 1, wherein
the emulated header includes a preamble field and a PHY field,
the transmission side performs constellation mapping on the preamble field and the PHY field using 64 Quadrature Amplitude Modulation (64 QAM) and transmits the preamble field and the PHY field using Binary Phase Shift Keying (BPSK), and
the reception side performs constellation mapping and decoding on the preamble field and the PHY field using BPSK.

5. The wireless device driving method of claim 1, wherein
the emulated header further includes a MAC field,
the transmission side performs constellation mapping on the MAC field using 64 QAM and transmits the MAC field using 16 QAM, and
the reception side performs constellation mapping and decoding on the MAC field using 16 QAM.

6. The wireless device driving method of claim 4, wherein the operation of performing constellation mapping and decoding using 64 QAM comprises performing decoding with four bits common to four adjacent constellation points in a constellation using 64 QAM.

7. The wireless device driving method of claim 1, further comprising reconstructing the ambient signal from the bit sequence.

8. The wireless device driving method of claim 7, further comprising performing spectrum monitoring, wherein the spectrum monitoring comprises:
performing classification according to a size of the reconstructed ambient signal; and
forming a waterfall plot by plotting the classified ambient signal along a time axis and a frequency axis.

9. The wireless device driving method of claim 8, wherein the spectrum monitoring is performed while adjusting power at which the transmission side transmits the emulated header.

10. The wireless device driving method of claim 7, further comprising an identification operation for identifying an RF device for providing the ambient signal, wherein the identification operation comprises:
training artificial intelligence (AI) with a frame transient state characteristic of the reconstructed ambient signal specific to the RF device; and
providing the reconstructed ambient signal to the trained artificial intelligence so that the artificial intelligence identifies the RF device corresponding to the provided ambient signal.

11. The wireless device driving method of claim 10, wherein the RF device is one of a drone, a mobile terminal, a router, and a video communication device.

12. The wireless device driving method of claim 7, wherein
the reconstructing of the ambient signal further comprises removing a phase error, and
the removing of the phase error comprises:
performing a correlation computation with a reference signal while changing a phase of the reconstructed ambient signal; and
selecting a phase in which the correlation computation has a greatest value.

13. The wireless device driving method of claim 12, wherein the selecting of the phase in which the correlation computation has the greatest value comprises selecting an ambient signal with a phase conforming to a regulation among ambient signals having the phase in which the correlation computation has the greatest value.

14. A transmission apparatus configured to hide a header emulated with a second protocol in a payload of a packet conforming to a first protocol and transmit the emulated header, wherein
the emulated header includes a preamble field including ten short symbols and 2.5 long symbols,
two payload symbols of the first protocol are emulated to the ten short symbols of the second protocol, and
two payload symbols of the first protocol are emulated to the 2.5 long symbols of the second protocol.

15. The transmission apparatus of claim 14, wherein
the first protocol is 802.11n, and
the second protocol is 802.11g.

16. The transmission apparatus of claim 14, wherein
the preamble field further includes a PHY field and a MAC field, and
the PHY field and the MAC field are each emulated as one payload symbol conforming to the first protocol.

17. The transmission apparatus of claim 14, wherein
the emulated header includes a preamble field and a PHY field, and
the transmission apparatus transmits the preamble field and the PHY field using Binary Phase Shift Keying (BPSK).

18. A reception apparatus configured to:
receive an ambient signal and a header emulated with a second protocol, hidden in a payload of a packet defined with a first protocol, and transmitted;
decode the ambient signal according to the second protocol to obtain a bit sequence; and
reconstruct the ambient signal from the bit sequence, wherein
the first protocol is 802.11n,
the second protocol is 802.11g,
the emulated header includes a preamble field including ten short symbols and 2.5 long symbols,
two payload symbols of the first protocol are emulated to the ten short symbols of the second protocol, and
two payload symbols of the first protocol are emulated to the 2.5 long symbols of the second protocol.

19. The reception apparatus of claim 18, wherein the reception apparatus ignores the header of the packet defined with the first protocol.

20. The reception apparatus of claim 18, wherein the reception apparatus is configured to:
classify the reconstructed ambient signal according to size; and
plot the classified ambient signal along a time axis and a frequency axis to form a waterfall plot to monitor a spectrum of the ambient signal.

* * * * *